(12) United States Patent
Epstein et al.

(10) Patent No.: US 12,060,201 B2
(45) Date of Patent: *Aug. 13, 2024

(54) LEAK-RESISTANT PAPER CLAMSHELL CONTAINERS

(71) Applicant: Kari-Out LLC, Tarrytown, NY (US)

(72) Inventors: Paul Epstein, Larchmont, NY (US); Jonathan T. Beales, Atlanta, GA (US)

(73) Assignee: KARI-OUT LLC, Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,152

(22) Filed: Sep. 7, 2022

(65) Prior Publication Data

US 2023/0075117 A1    Mar. 9, 2023

Related U.S. Application Data

(63) Continuation of application No. 17/209,067, filed on Mar. 22, 2021, now Pat. No. 11,465,798, and a
(Continued)

(51) Int. Cl.
*B65D 5/00* (2006.01)
*B65D 5/20* (2006.01)
(Continued)

(52) U.S. Cl.
CPC .......... *B65D 5/0085* (2013.01); *B65D 5/2057* (2013.01); *B65D 5/241* (2013.01);
(Continued)

(58) Field of Classification Search
CPC .......... B65D 5/68; B65D 5/244; B65D 85/36; B65D 5/2047; B65D 5/667; B65D 5/5455;
(Continued)

(56) References Cited

U.S. PATENT DOCUMENTS

| | | |
|---|---|---|
| 3,876,132 A | 4/1975 | Kuchenbecker |
| 4,472,896 A | 9/1984 | Brauner |

(Continued)

OTHER PUBLICATIONS

International Search Report for PCT/US2019/052447 dated Oct. 30, 2019.
(Continued)

*Primary Examiner* — Christopher R Demeree
(74) *Attorney, Agent, or Firm* — PABST PATENT GROUP LLP

(57) ABSTRACT

Blanks for forming clamshell containers and the resulting clamshell containers are described. The clamshell containers include a tray and a lid that are hingedly connected together. The tray is liquid tight, and typically includes gussets on each corner to prevent leakage. The lid and tray can be locked via at least one locking mechanism, optionally two different locking mechanisms. A first locking mechanism involves a front panel on the tray, with an extension portion that terminates in a hook or tab. The extension portion can fold over the front panel of the lid, and the hook or tabs slide into a slit(s) on the top of the lid. An optional second locking mechanism involves lid detents and tray detents. In some embodiments, in the locked position, the lid detents are underneath the tray detents and the tray detents retain the lid detents in place until a force is applied.

22 Claims, 33 Drawing Sheets

Related U.S. Application Data continuation-in-part of application No. PCT/US2019/052447, filed on Sep. 23, 2019.

(60) Provisional application No. 62/734,904, filed on Sep. 21, 2018.

(51) Int. Cl.
| | |
|---|---|
| *B65D 5/24* | (2006.01) |
| *B65D 5/42* | (2006.01) |
| *B65D 5/54* | (2006.01) |
| *H04W 24/08* | (2009.01) |
| *H04W 76/19* | (2018.01) |
| *H04W 88/14* | (2009.01) |

(52) U.S. Cl.
CPC ......... *B65D 5/4204* (2013.01); *B65D 5/4295* (2013.01); *B65D 5/5455* (2013.01); *H04W 24/08* (2013.01); *H04W 76/19* (2018.02); *H04W 88/14* (2013.01)

(58) Field of Classification Search
CPC .... B65D 5/4295; B65D 5/4204; B65D 5/241; B65D 5/2057; B65D 5/0085; A47G 21/001
USPC ....... 229/114, 146, 906, 148, 902, 145, 153, 229/113, 125.28, 149, 120; 206/541
See application file for complete search history.

(56) References Cited

U.S. PATENT DOCUMENTS

| | | | |
|---|---|---|---|
| 4,489,879 A | 12/1984 | Mode | |
| 4,694,987 A * | 9/1987 | Forbes, Jr. | ......... B65D 5/48002 229/120.04 |
| 4,848,648 A | 7/1989 | Eisman | |
| 4,877,178 A | 10/1989 | Eisman | |
| 4,905,889 A | 3/1990 | Schuster | |
| 4,944,451 A | 7/1990 | Forbes | |
| 5,009,363 A | 4/1991 | Zavatone | |
| D326,227 S | 5/1992 | Forbes | |
| 5,160,081 A | 11/1992 | Beales | |
| D332,393 S | 1/1993 | Boone | |
| 5,205,476 A | 4/1993 | Sorenson | |
| 5,323,958 A | 6/1994 | Liu | |
| 5,326,017 A | 7/1994 | Liu | |
| 5,332,148 A | 7/1994 | Liu | |
| D349,610 S | 8/1994 | Scott | |
| 5,388,758 A | 2/1995 | Scovell | |
| 5,411,204 A | 5/1995 | Demay | |
| 5,467,916 A | 11/1995 | Beales | |
| 5,575,420 A | 11/1996 | Whitnell | |
| 5,588,583 A | 12/1996 | Cargile | |
| 5,601,231 A | 2/1997 | Cai | |
| 5,839,652 A | 11/1998 | Ben-haim | |
| 5,908,152 A | 6/1999 | Tullis | |
| 6,471,121 B1 | 10/2002 | Nielsen | |
| D519,366 S | 4/2006 | Epstein | |
| D519,830 S | 5/2006 | Yocum | |
| 7,293,695 B2 | 11/2007 | Stier | |
| 7,673,747 B2 | 3/2010 | Yoda | |
| 8,523,049 B2 | 9/2013 | Fitzwater | |
| 8,672,215 B2 | 3/2014 | Learn | |
| 8,733,626 B2 | 5/2014 | Learn | |
| 8,820,617 B2 | 9/2014 | Silverstein | |
| 8,844,718 B2 | 9/2014 | Hall | |
| 9,139,330 B2 * | 9/2015 | Gomez | ................ B65D 5/667 |
| 9,278,774 B2 * | 3/2016 | Fairchild, Jr. | .......... B65D 5/667 |
| D762,468 S * | 8/2016 | Pantelleria | ..................... D9/423 |
| 9,522,772 B2 | 12/2016 | Fu | |
| D777,029 S | 1/2017 | Stratton | |
| 9,540,135 B2 | 1/2017 | Robertson | |
| D787,321 S * | 5/2017 | Pantelleria | ..................... D9/423 |
| 9,908,690 B2 | 3/2018 | Rosenkrantz | |
| 10,017,290 B2 | 7/2018 | Faulkner | |
| 10,053,259 B2 * | 8/2018 | Gungner | ............... B31B 50/734 |
| 10,086,972 B2 * | 10/2018 | Hajek | ................. B65D 5/0085 |
| 10,266,304 B2 | 4/2019 | Smith | |
| D876,951 S | 3/2020 | Sill | |
| 10,676,233 B2 * | 6/2020 | Wolf | .................... B65D 5/0085 |
| 10,829,262 B2 | 11/2020 | Sill | |
| 10,913,566 B2 | 2/2021 | Exner | |
| D955,225 S | 6/2022 | Epstein | |
| 11,465,798 B2 | 10/2022 | Epstein | |
| 2005/0051461 A1 | 3/2005 | Bryant | |
| 2005/0199689 A1 | 9/2005 | Chang | |
| 2005/0205570 A1 | 9/2005 | Ramirez | |
| 2007/0267467 A1 | 11/2007 | Burke | |
| 2011/0253587 A1 | 10/2011 | Pinkstone | |
| 2012/0000972 A1 | 1/2012 | Learn | |
| 2012/0037692 A1 | 2/2012 | Fitzwater | |
| 2012/0125987 A1 | 5/2012 | Hubbard | |
| 2012/0138668 A1 | 6/2012 | Zinck | |
| 2014/0263595 A1 | 9/2014 | Pantelleria | |
| 2014/0353367 A1 | 12/2014 | Fairchild | |
| 2016/0362217 A1 | 12/2016 | Hajek | |
| 2018/0251256 A1 | 9/2018 | Baryshyan | |
| 2019/0047746 A1 | 2/2019 | Kunishima | |
| 2021/0053718 A1 | 2/2021 | Bautista | |
| 2021/0284381 A1 | 9/2021 | Valencia | |
| 2022/0106072 A1 | 4/2022 | Hartinger Peña | |
| 2022/0153468 A1 | 5/2022 | Epstein | |

OTHER PUBLICATIONS

Good Start Packaging: Fiber Compost-A-Pak from Mar. 24, 2016: http://web.archive.org/web/20160324111743/https://www.goodstartpackaging.com/.

* cited by examiner

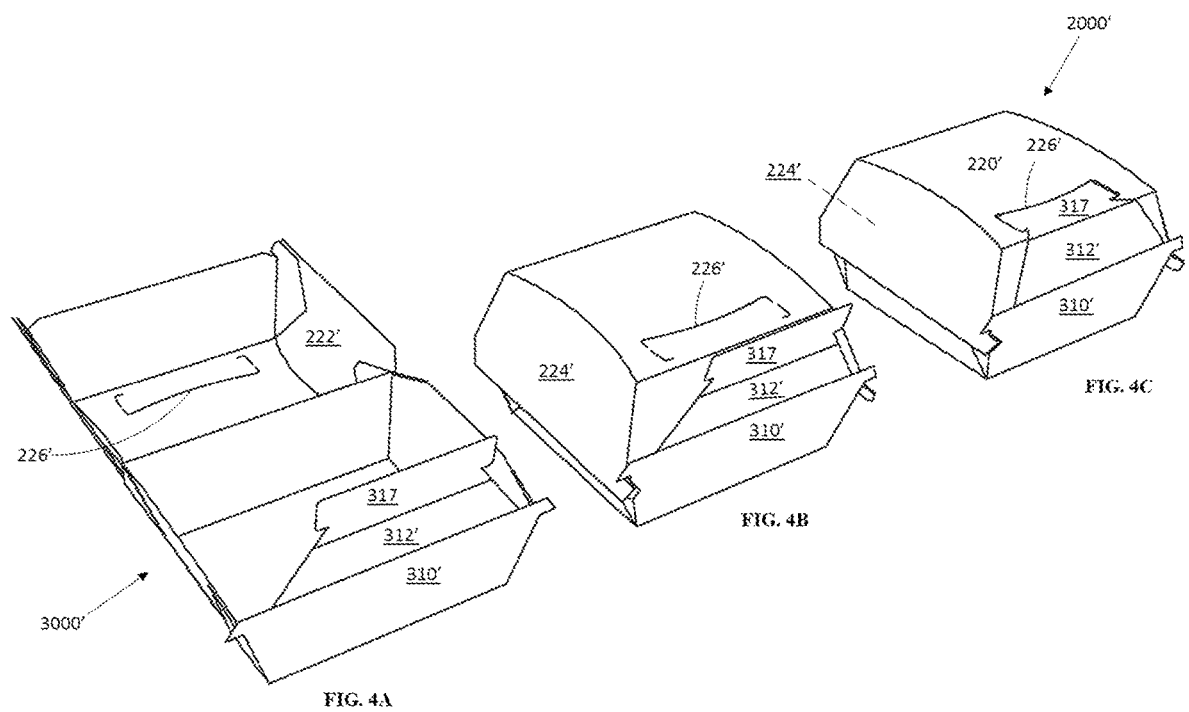

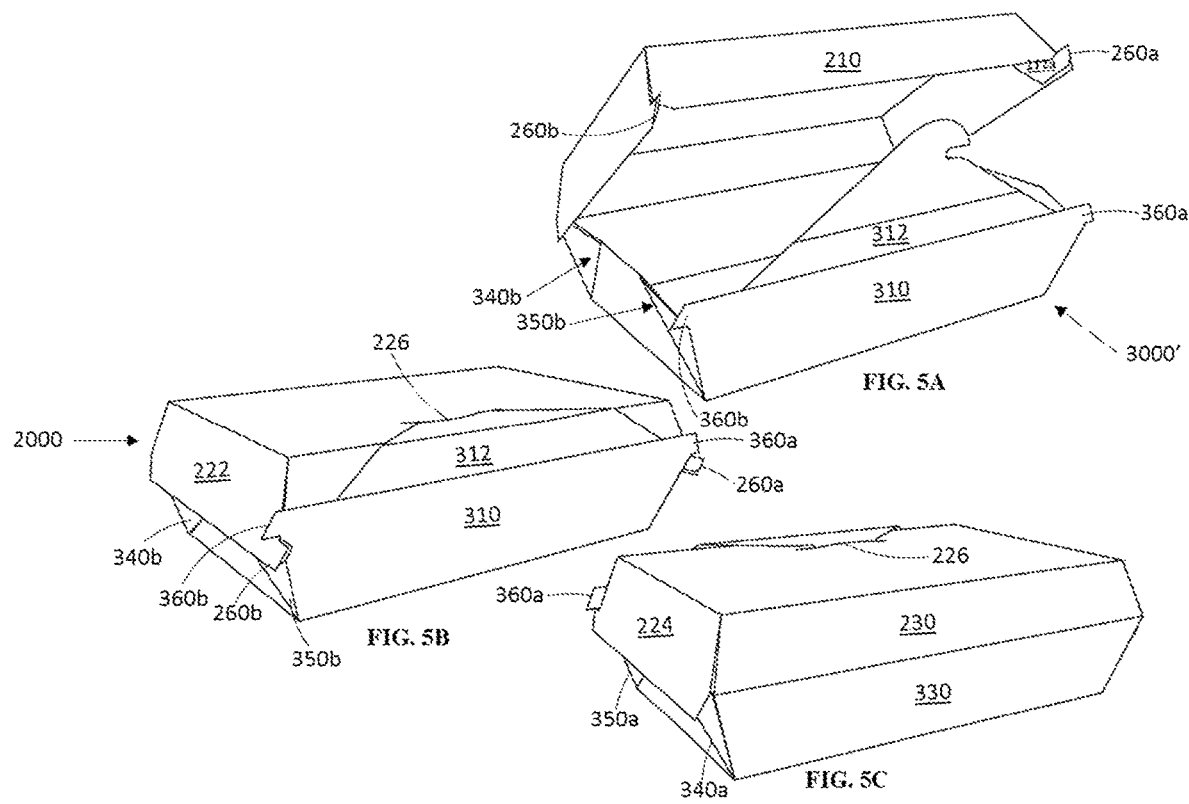

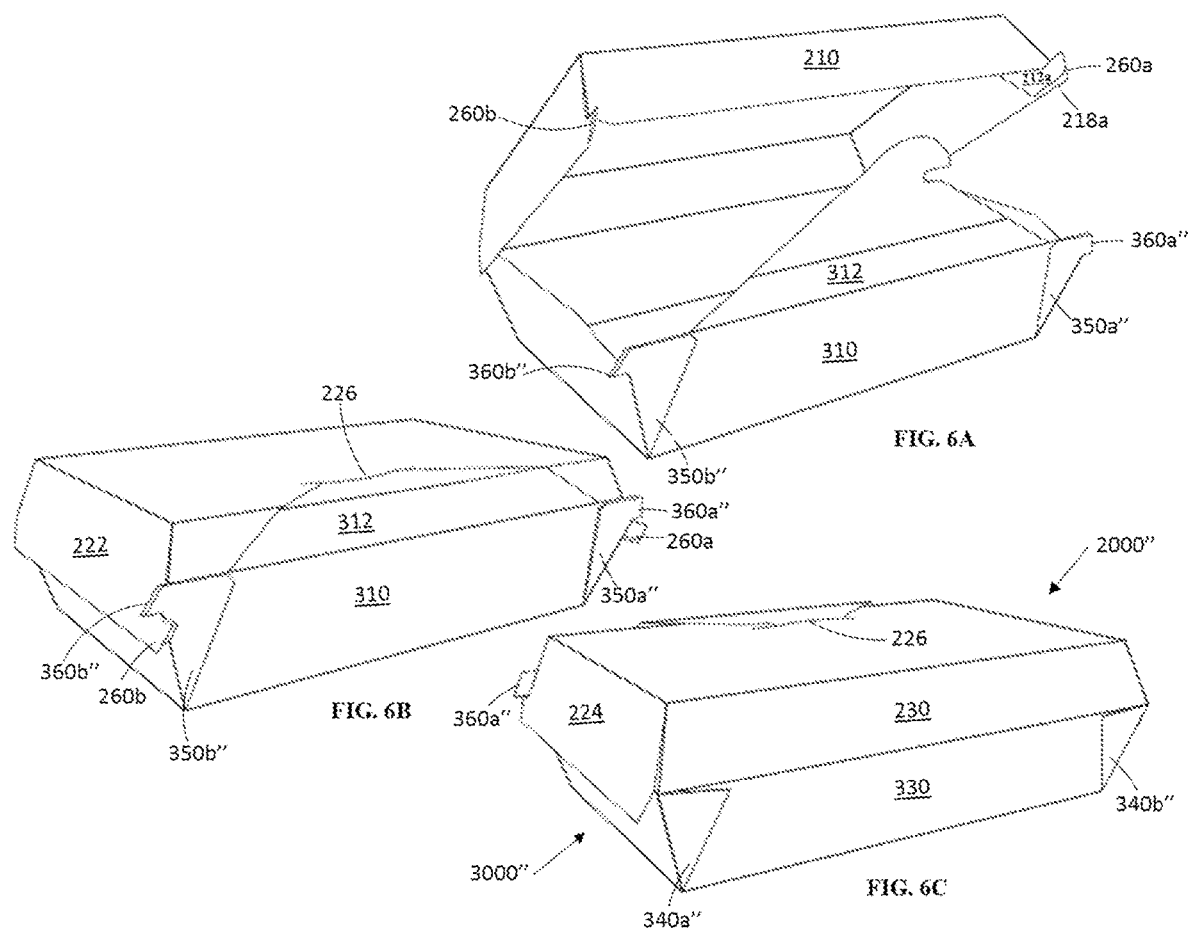

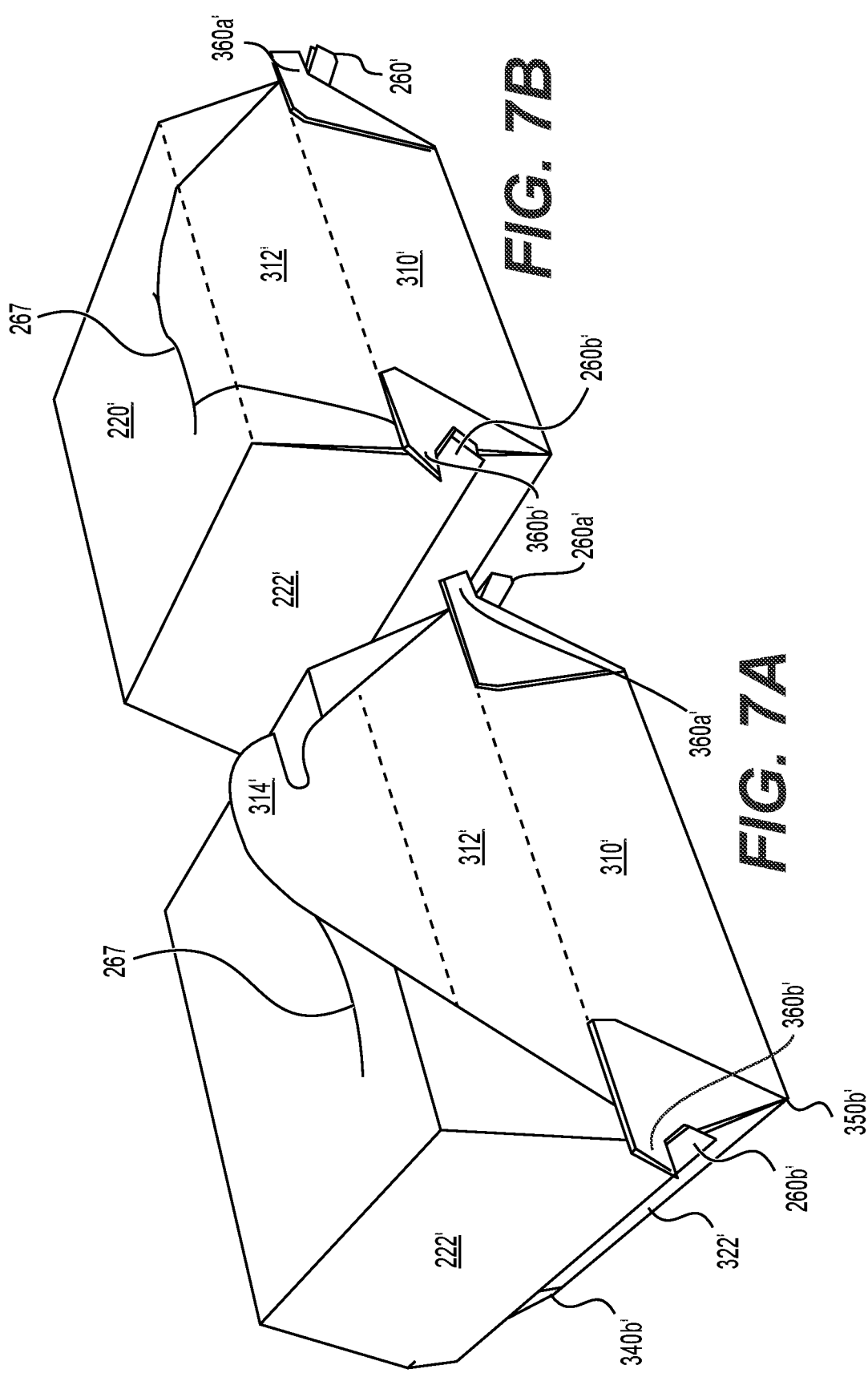

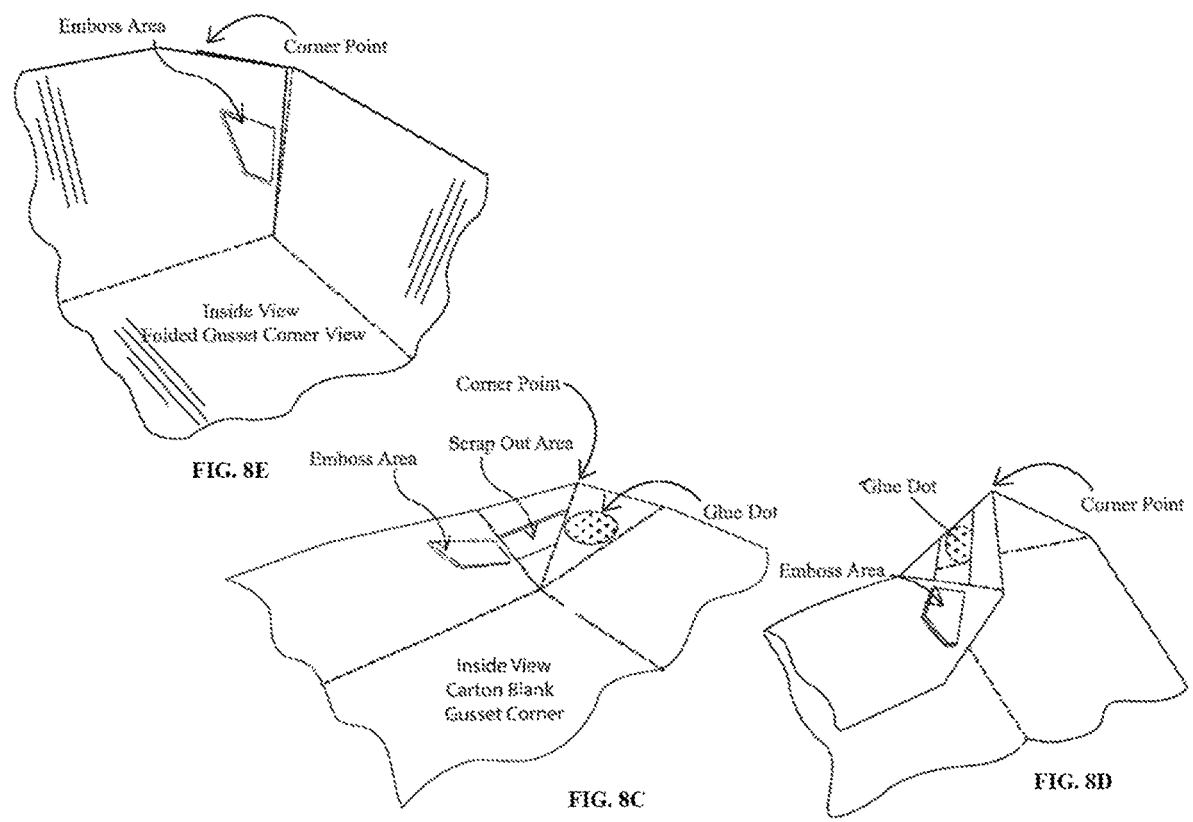

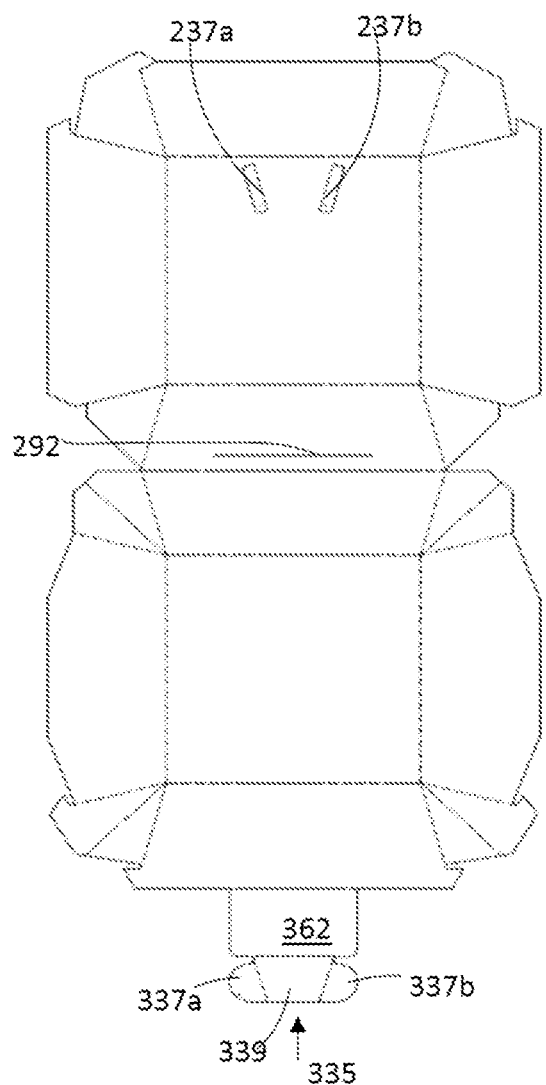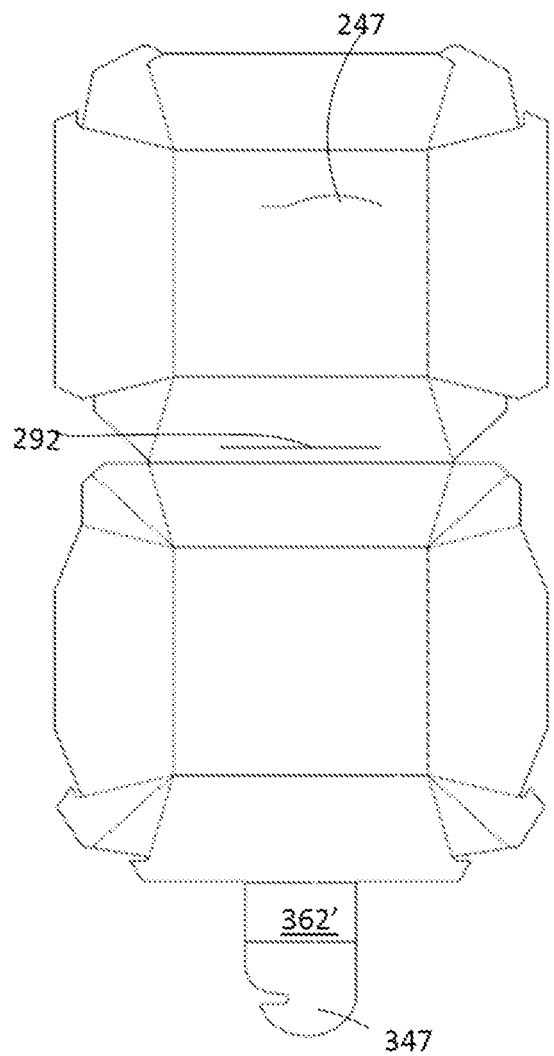
FIG. 9A
FIG. 9B

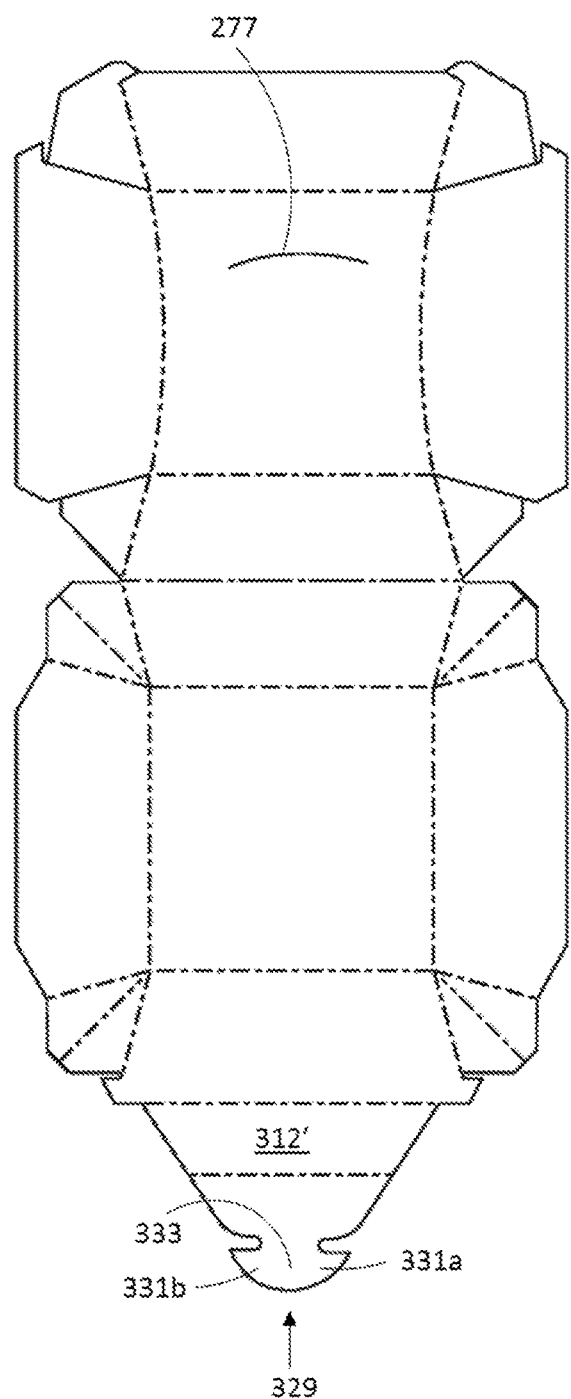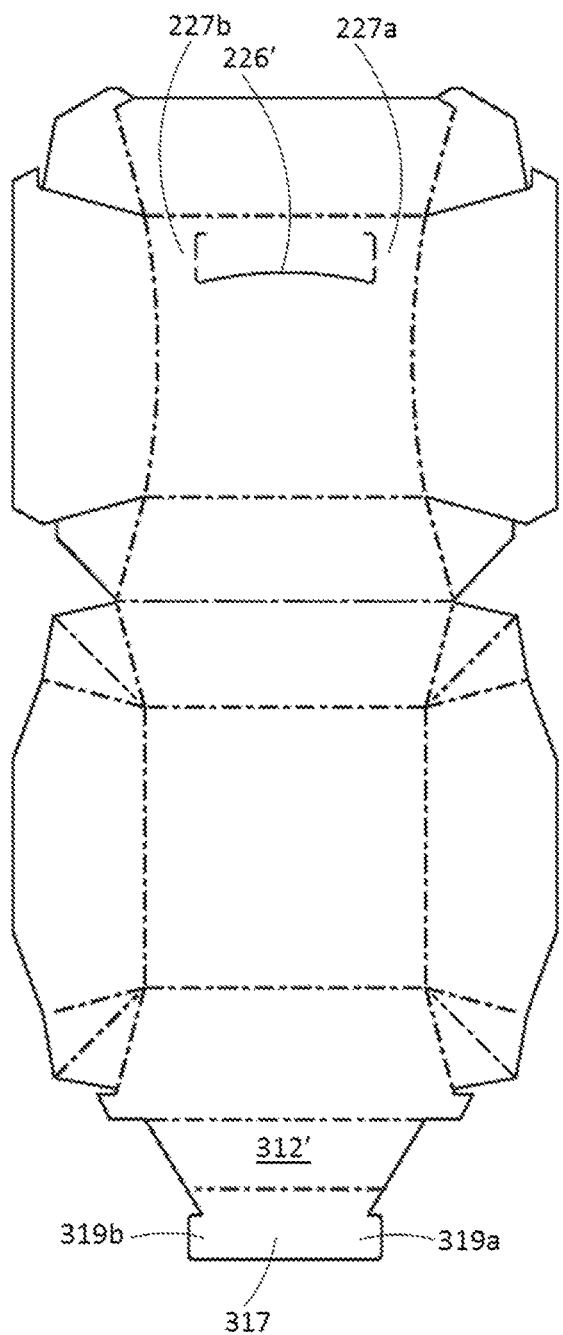
FIG. 9E
FIG. 9F

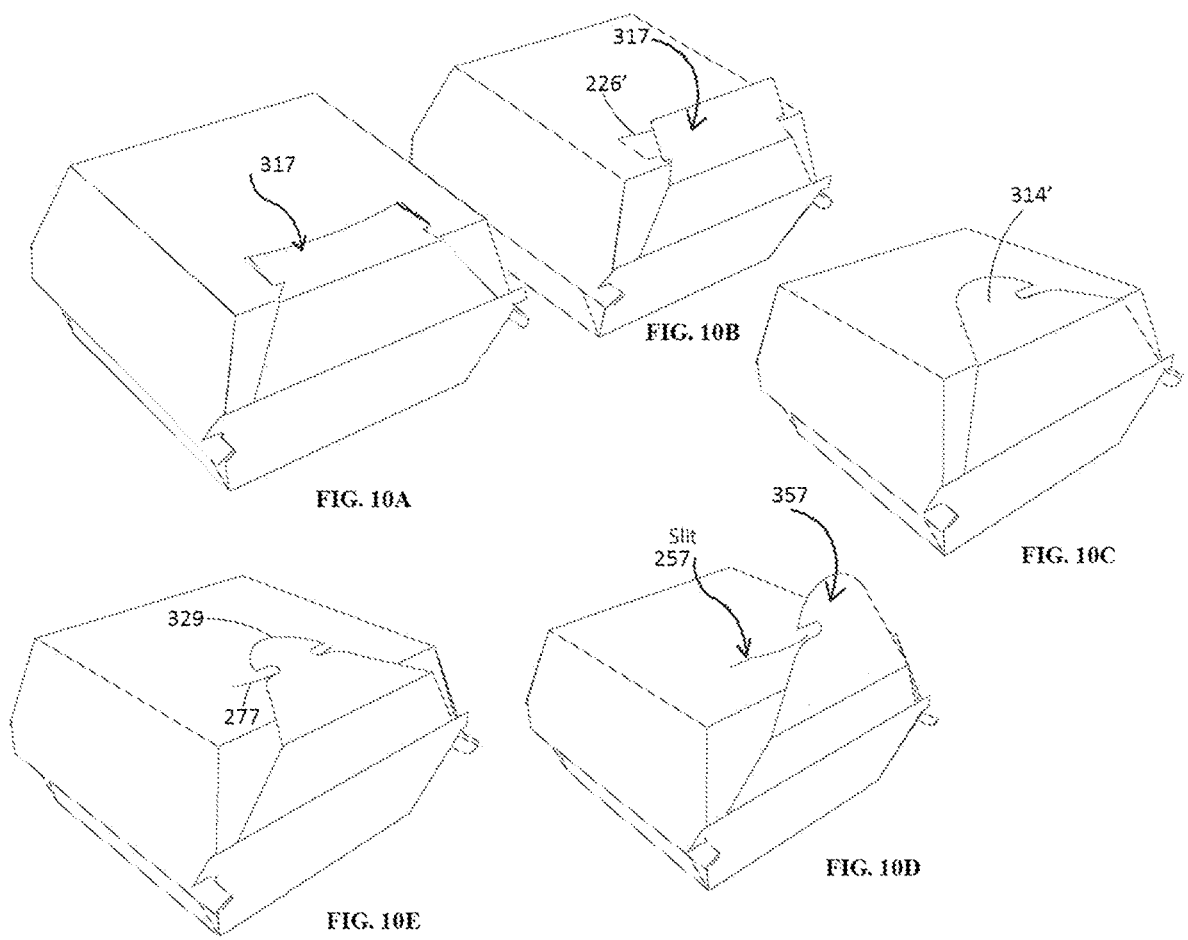

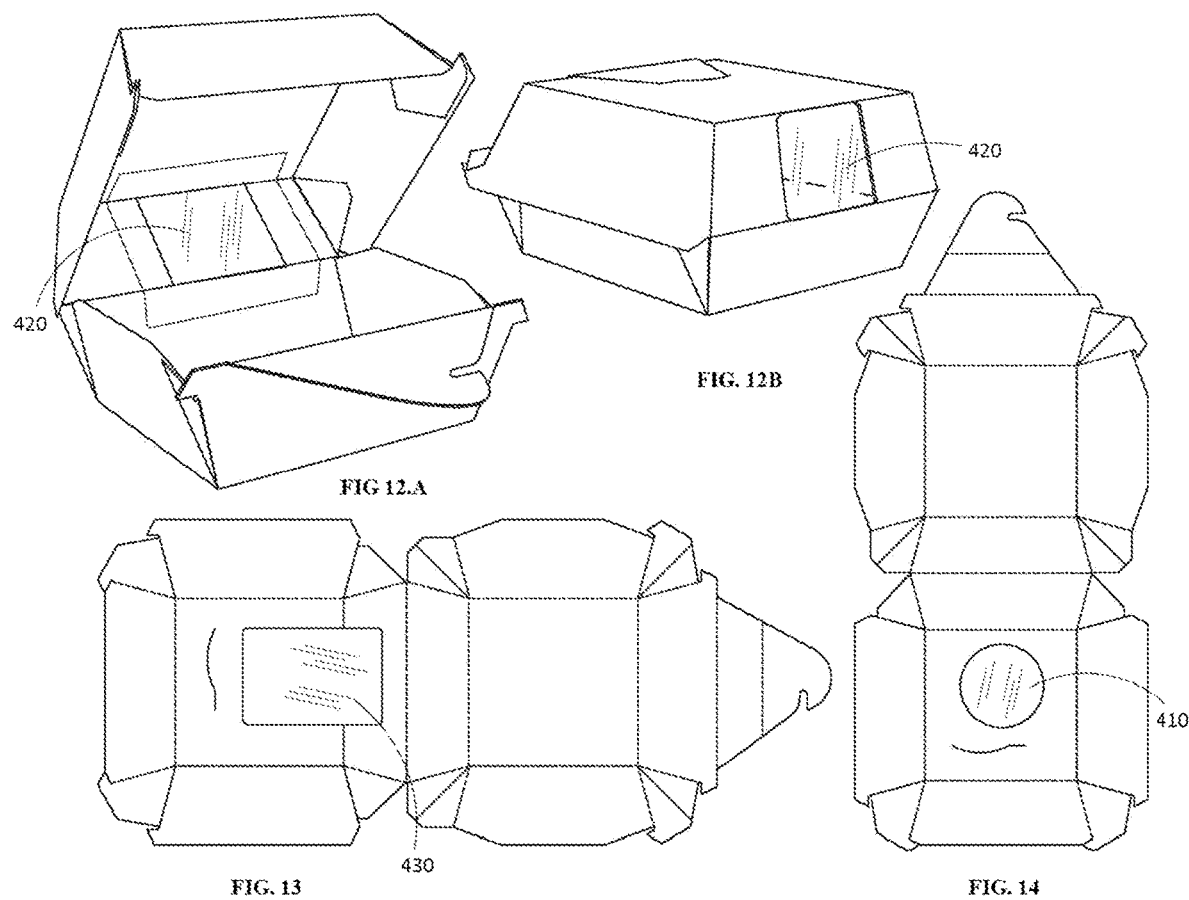

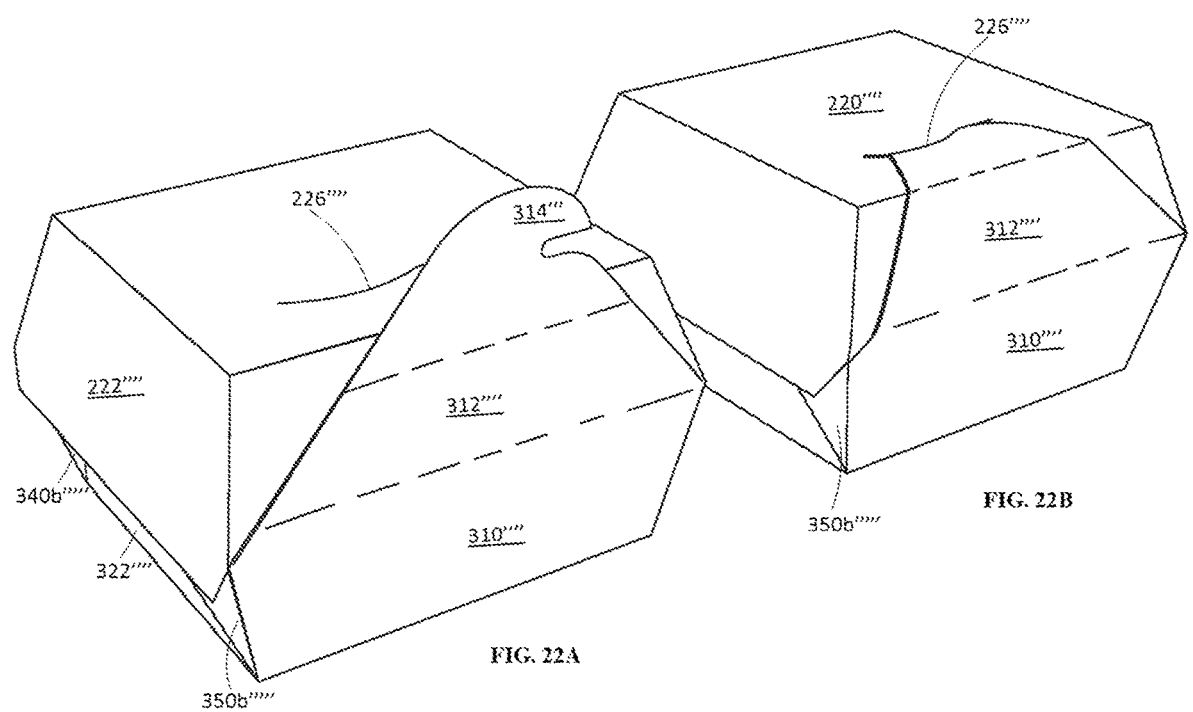

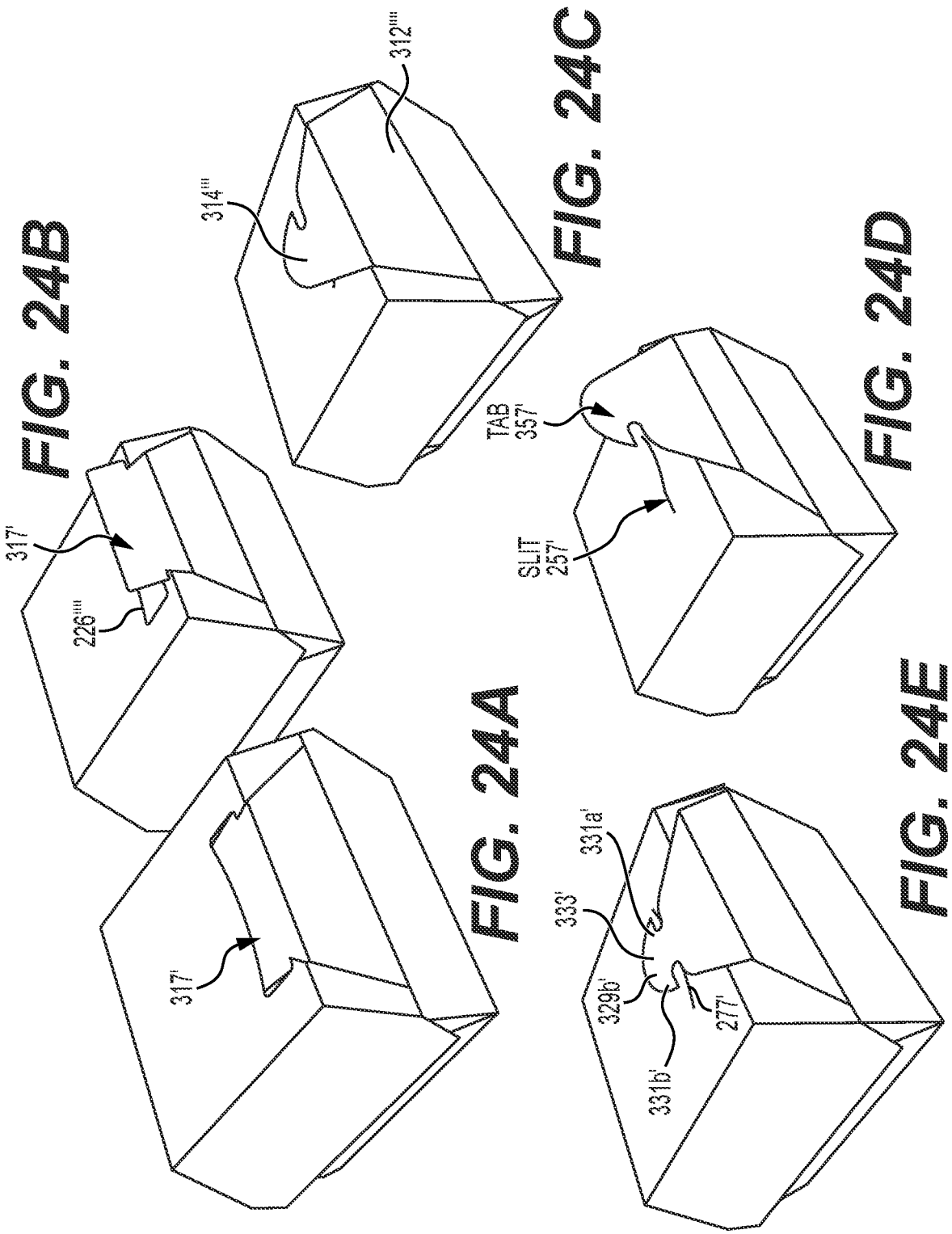

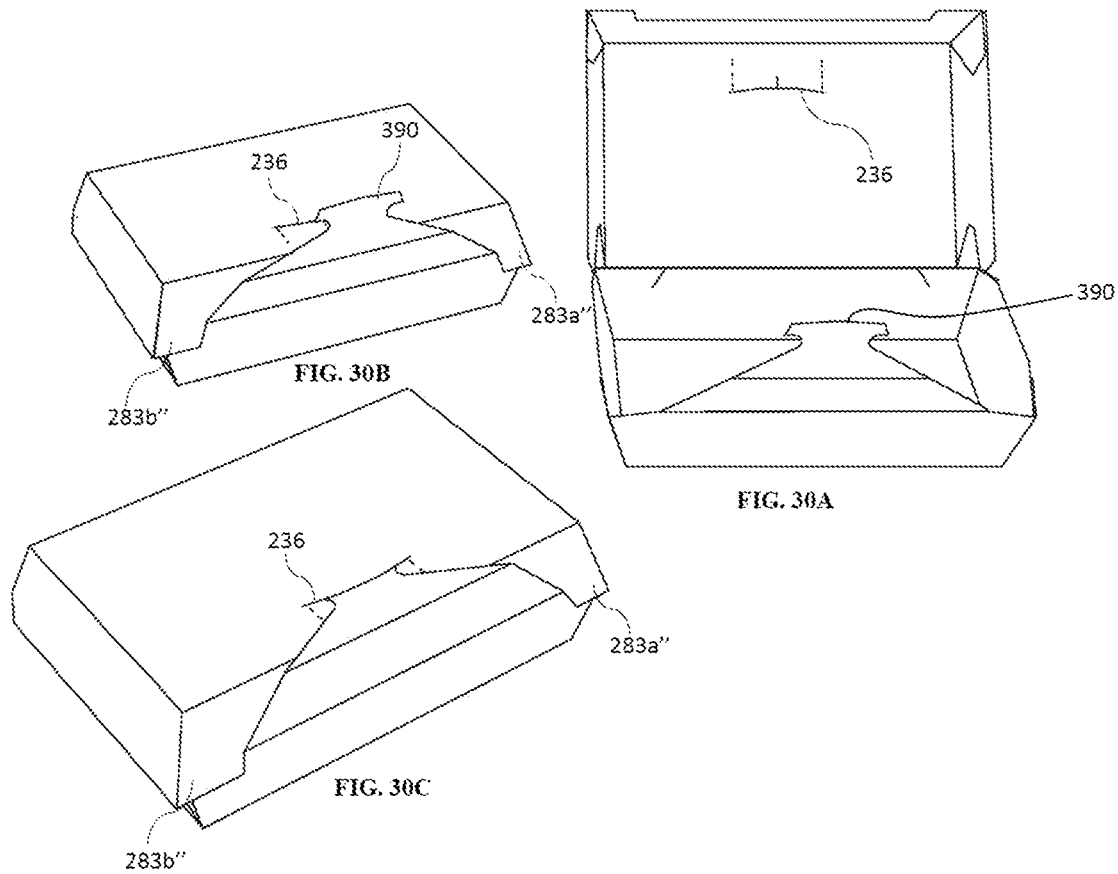

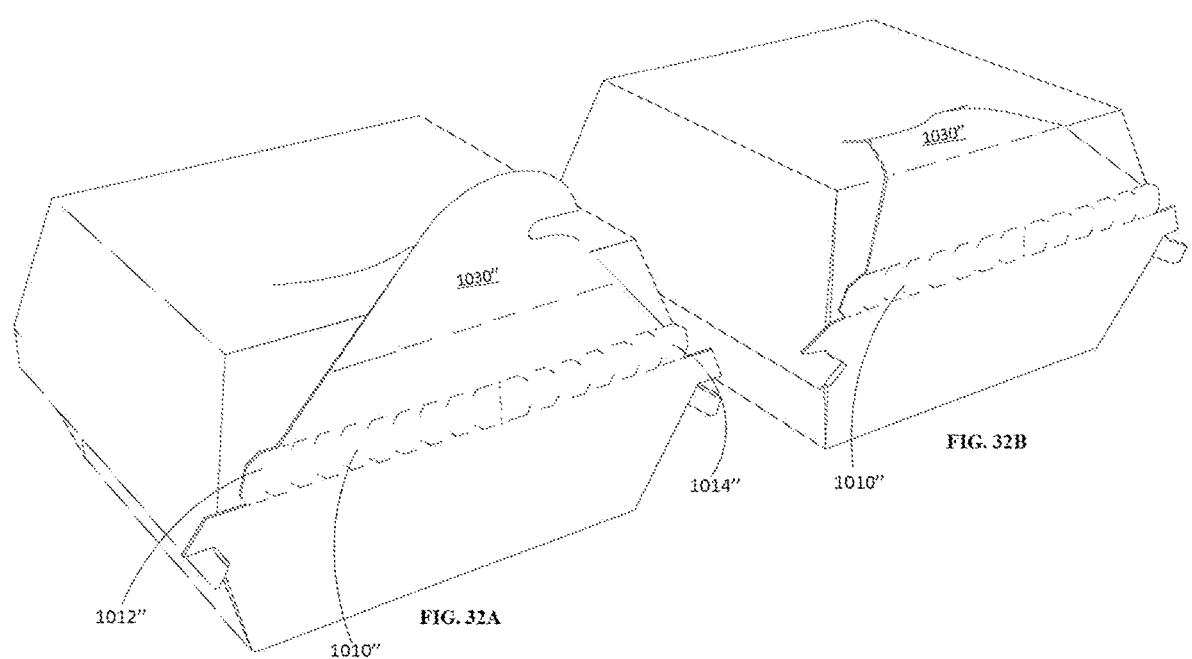

LEAK-RESISTANT PAPER CLAMSHELL CONTAINERS

CROSS-REFERENCE TO RELATED APPLICATION

The present application is a continuation of U.S. application Ser. No. 17/209,067, filed Mar. 22, 2021, which claims priority to PCT Application No. PCT/US2019/052447 filed on Sep. 23, 2019 and U.S. Application No. 62/734,904, filed Sep. 21, 2018, the disclosures of which are incorporated herein by reference in their entirety.

FIELD OF THE INVENTION

This invention generally relates to containers for storing and transporting food.

BACKGROUND OF THE INVENTION

Various containers are used to store and transport food, particularly in the "take-out" food industry. Food storage containers are typically formed by mating a lid with a base. Preferred materials include paper and plastics. Many different containers have been designed to prevent leakage of fluids during travel and prevent or reduce spoilage of foods. However, many of these containers are made from styrofoam and other non-degradable materials.

There is a need for improved containers for food storage and transportation. Particularly, there is a need for containers that are able to secure the food inside the container prior to use and prevent early or inadvertent opening of the container. There is also a need for improved food storage containers that are made from easily degraded or recycled materials, such as paperboard, which also prevent or reduce leakage of liquids or sauces that are stored in the containers.

SUMMARY OF THE INVENTION

Blanks formed from paperboard for forming clamshell containers and the resulting clamshell containers are described herein. The clamshell containers include a tray and a lid that are hingedly connected together, such that the lid can be closed over the tray to enclose food therein, or opened to allow access to and removal of the food from the tray. The tray is leak-resistant.

The lid and tray are able to be secured in the closed position via one or more locking mechanisms. The container includes at least one locking mechanism, and optionally includes two or more locking mechanisms.

A first locking mechanism involves a front panel on the tray, which includes a panel extension portion that terminates in a tab closure mechanism. The extension portion folds over the front panel of the lid, and the tab(s) slide into a slit on the top of the lid such that the container is in its closed and locked position.

The tray is liquid tight and typically includes gussets on each corner to prevent leakage. The gussets can attach to the side panels of the tray or to the front panel and rear panel of the tray.

Optionally, the container includes a second locking mechanism. The second locking mechanism typically involves lid detents and tray detents. In some embodiments, the lid detents and tray detents are substantially perpendicular to each other. In the locked position, the lid detents are underneath the tray detents and the tray detents secure the lid detents in place until a force is applied to separate them. In other embodiments, the lid detents and the tray detents are aligned substantially parallel to each other and configured to contact and interlock such that one pair of detents lies on top of the other pair of detents in the locked position.

BRIEF DESCRIPTION OF THE DRAWINGS

Unless otherwise stated, within the borders of an illustration of a blank, dashed lines indicate fold lines or other lines of weakness and solid lines indicate borders flaps of the blank.

Unless otherwise stated, with respect to illustrations of the assembled container, solid lines indicate fold lines, score lines, perforation lines, or other lines of weakness.

FIGS. 4A-4C are perspective views of a container assembled from the blank depicted in FIG. 3 in the open (FIG. 4A) and closed positions (FIGS. 4B and 4C). FIG. 4C shows the container in the closed and locked position.

FIGS. 5A-5C are various views of the clamshell container that forms when the blank depicted in FIG. 1 is assembled (however, it contains a different hook configuration, which faces the opposite direction compared to the hook depicted in the blank of FIG. 1). FIG. 5A depicts the container in the open position; FIG. 5B depicts a front view of the container in the closed and locked position; FIG. 5C depicts a rear view of the container in the closed and locked position.

FIGS. 6A-6C are various views of the clamshell container that forms when the blank depicted in FIG. 1 with a modification of the gussets as shown in FIG. 2A is assembled. When the clamshell container is assembled, the tray detents are double ply and the corresponding gussets are attached to the front panel. FIG. 6A depicts the container in the open position; FIG. 6B depicts a front view of the container in the closed and locked position; FIG. 6C depicts a rear view of the container in the closed and locked position.

FIGS. 7A and 7B are two views of the clamshell container that forms when the blank depicted in FIG. 3 is assembled (however a different locking mechanism is depicted in FIGS. 7A and 7B). FIG. 7A depicts the container in the closed position with only the detents in the locked position; FIG. 7B depicts a front view of the container in the closed position with both the detents and the hook tab that extends from the front panel in the locked position.

FIG. 8A depicts a blank with a cut out portion in one of the gusset panels and an emboss slug in a proximal portion of the adjacent side panel, which is assembled to form a gusset that adheres to the outside of the adjacent side panel. FIG. 8B depicts a blank with a cut out portion in the opposite one of the gusset panels (compared to FIG. 8A) and an emboss slug in a portion of the adjacent side panel, which is assembled to form a gusset that adheres to the outside of the adjacent side panel. FIGS. 8C-8E show the relative positions of the portions that fold together to form the gusset corner. FIG. 8C shows the blank. FIG. 8D shows the blank of FIG. 8C in a partially folded position. FIG. 8E shows the fully assembled gusset corner form the inside view.

FIGS. 9A-9F show blanks for forming a square clamshell container with different closing mechanisms. FIG. 9A shows two tabs attached to a rectangular shaped extension portion configured to fit in two slits on the top panel of the lid. FIG. 9B shows a left hook attached to a rectangular shaped extension portion configured to fit in a curved slit on the top panel of the lid. FIG. 9C shows a right hook attached to a triangular shaped extension portion configured to fit in a curved slit on the top panel of the lid. FIG. 9D shows a left hook attached to a triangular shaped extension portion configured to fit in a curved slit on the top panel of the lid. FIG. 9E shows a two-sided hook attached to a triangular shaped extension portion configured to fit in a curved slit on the top panel of the lid, where the left hook is attached to the right hook via a curved connecting portion. FIG. 9F shows a tab with two flaps attached to a triangular shaped extension portion configured to fit in a curved slit on the top panel of the lid.

FIGS. 10A-10E show assembled views of the blanks of FIGS. 9C-9F, respectively. FIGS. 10A and 10B show the container formed by the blank of FIG. 9F in the closed and locked (FIG. 10A) and closed and unlocked (FIG. 10B) positions. FIG. 10C shows the container formed by the blank of FIG. 9C in the closed and unlocked position. FIG. 10D shows the container formed by the blank of FIG. 9D in the closed and unlocked position. FIG. 10E shows the container formed by the blank of FIG. 9E in the closed and unlocked position.

FIGS. 12A and 12B show front (FIG. 12A) and rear (FIG. 12B) views of a container with a window in the rear lid panel.

FIG. 13 shows a plan view of a blank for forming a container with a square lid and square tray with a window in the top and rear lid panels.

FIG. 14 shows a plan view of a blank for forming a container with a square lid and square tray with a window in the top lid panel.

FIG. 17A depicts the container in the open position; FIG. 17B depicts the container in a closed position. FIG. 17C depicts the container in the closed and locked position.

FIG. 19A depicts the container in the open position; FIG. 19B depicts a front view of the container in the closed and locked position; FIG. 19C depicts a rear view of the container in the closed and locked position.

FIG. 21C shows the container in the closed and locked position.

FIGS. 22A and 22B are two views of the clamshell container that forms when the blank depicted in FIG. 20 is assembled (however a hook tab for locking is depicted in FIGS. 22A and 22B). FIG. 22A depicts the container in the closed position; FIG. 22B depicts a front view of the container in the closed position with the hook tab that extends from the front panel of the tray in the locked position.

FIG. 23A shows two tabs attached to a rectangular shaped extension portion configured to fit in two slits on the top panel of the lid. FIG. 23B shows a left hook attached to a rectangular shaped extension portion configured to fit in a curved slit on the top panel of the lid. FIG. 23C shows a right hook attached to a triangular shaped extension portion configured to fit in a curved slit on the top panel of the lid. FIG. 23D shows a left hook attached to a triangular shaped extension portion configured to fit in a curved slit on the top panel of the lid.

FIGS. 24A and 24B show the container formed by the blank of FIG. 23C in the closed and locked (FIG. 24A) and closed and unlocked (FIG. 24B) positions (however it contains a different shaped tab with two flaps attached to a triangular shaped extension portion configured to fit in a curved slit on the top panel of the lid is depicted in FIGS. 24A and 24B compared to the tab depicted in the blank of FIG. 23C). FIG. 24C shows the container formed by the blank of FIG. 23C in the closed and unlocked position. FIG. 24D shows the container formed by the blank of FIG. 23D in the closed and unlocked position. FIG. 24E shows the container formed by the blank of FIG. 23C in the closed and unlocked position (however it contains a differently shaped hook compared to the hook depicted in the blank of FIG. 23C). The hook depicted in FIG. 24E is a two-sided hook attached to a triangular shaped extension portion configured to fit in a curved slit on the top panel of the lid is depicted in FIG. 24E.

FIG. 25A is a front perspective view of the container in a partially open position. FIG. 25B is a rear perspective view of the container in the closed and locked position.

FIGS. 30A-30C show the container formed by the blank of FIG. 29 in the open (FIG. 30A), closed and unlocked (FIG. 30B), and closed and locked (FIG. 30C) positions.

FIG. 31A depicts the container in the open position; FIG. 31B depicts a front view of the container in the closed and locked position; FIG. 31C depicts a rear view of the container in the closed and locked position.

FIGS. 32A and 32B are two views of the clamshell container that forms when the blank depicted in FIG. 3 is assembled (however the locking mechanism is modified as depicted in FIGS. 7A and 7B and the extension portion on the front tray panel is modified to contain a zipper portion as depicted in FIG. 2B). FIG. 32A depicts the container in the closed position with only the detents in the locked position; FIG. 32B depicts a front view of the container in the closed position with both the detents and the hook tab that extends from the front panel in the locked position.

DETAILED DESCRIPTION OF THE INVENTION

Figure 1:
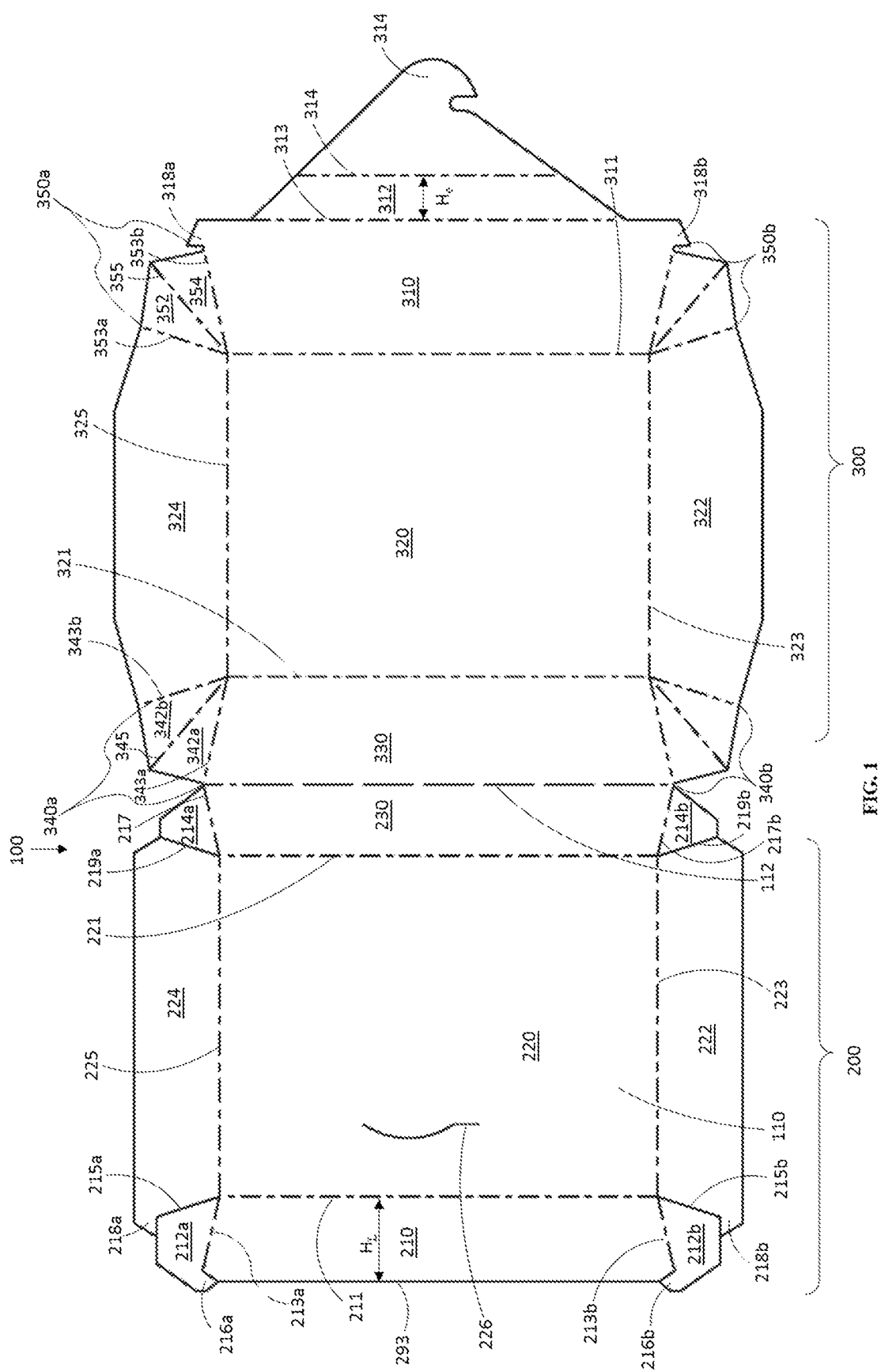
FIG. 1 is a plan view of an exemplary blank configured to form a clamshell container with a lid and a tray, where the tray has a rectangular bottom panel and the lid has a rectangular top panel.

Paperboard blanks for forming clamshell containers and the resulting clamshell containers are described herein.

I. Assembled Clamshell Container

The clamshell container contains a tray and a lid that are hingedly connected together such that the lid can be closed over the tray to enclose food therein, or opened to allow access to and removal of the food from the tray.

In the closed position, the edge of the front panel of the tray contacts the inside surface of the upper portion of the front panel of the lid, however the side panels of the lid typically protrude beyond the edge of the side panels of the tray. The gap between the lid and the tray allows for heat and steam to escape from the closed container, when hot food is enclosed therein.

The lid typically contains a unitary top panel. In contrast to a lunch pail commonly used in take-out for Chinese food, the top of the lid (e.g. the top panel) is not formed from multiple flaps.

The corners of the tray are liquid tight, such as due to the presence of a gusset in each corner. This prevents or reduces leakage of liquids out of the tray.

The lid and the tray can be locked via a single locking mechanism involving a belt that extends from one portion of the clamshell container, such as the tray, and wraps around part of the other portion, such as the lid, and is secured thereto, such as by inserting a tab into a slot configured to receive and retain the tab.

The lid and the tray can be locked in the closed position via a belt formed of an extension portion that terminates in a tab, which slides into a correspondingly shaped slit or slits on another surface of the closed container. Typically, one or more of the panels (e.g. side or front) of the tray include an extension portion.

The lid and the tray can be unlocked when a user applies a force to the tab to pull it out of or remove it from the slit or slits. Due to the configuration of the tab and the slit, the user may need to apply force in two directions to remove the tab without breaking it. Optionally, the tab breaks when force is applied, such as in a single direction, and the container is unlocked. Optionally, the front and/or the rear of the lid or the tray contains two or more perforated lines, preferably the lid or the tray contains two perforated parallel line(s) that define a zipper region, to allow for easy opening and optionally removal of the lid from the tray. Typically, the zipper region on the lid and/or tray is located above the corners of the tray. For example, a zipper region is located on the extension portion of the front tray panel, in the region connecting the extension portion and the tab ("connecting region"), and/or on the rear lid panel. Optionally, one pull-tab is located on at least one of the ends, optionally on both of the ends of the zipper region. For example, the zipper can be located on the extension portion of the front tray panel, in the connecting region, and/or the rear lid panel of the container. The incorporation of a zipper can facilitate the opening of the locked container. For example, a user can remove the zipper located on the front tray panel of the locked container and thus open the container to provide easy access to the contents within the container. If at least one tab is present on the end of the zipper portion, the user can pull the tab to remove the zipper and thereby open the lid to access the food located inside the container.

Optionally, the lid or the tray contains only one perforated line on the front and/or the rear of the container to allow easy opening of the lid from the tray. The perforated line can be located anywhere on the extension portion, at the fold line connecting the extension portion and the tab, at the fold line connecting the extension portion and the front tray panel, in the connecting region, anywhere on the rear lid panel, and/or at the fold line connecting the rear tray panel and the rear lid panel. For example, the perforated line is located on the extension portion. The user can apply a single direction force on the perforated line (e.g. push open the perforated line) to separate the tray from the tab and thus open the container.

Optionally, the container includes a single perforated line or a zipper on the front of the container and a single perforated line or a zipper on the rear of the container, to allow for removal of the lid from the tray.

The tray can contain an extension portion that extends from the top of the front tray panel beyond the height of the side tray panels, when the tray is assembled. The extension portion terminates in a tab of any suitable shape, such as a hook tab or tuck tabs, which fit in a slit on the top panel of the lid to secure the container in the closed position. Optionally, one or two perforated lines, preferably two perforated parallel lines are located on the extension portion to allow for easy opening of the container from its locked position. When two perforated parallel lines are located on the extension portion, they form a zipper region on the front tray panel.

Generally, neither the lid nor the tray contains a peripheral flange that projects outwardly from the lid and/or tray. Typically, both the lid and the tray do not contain flanges that project outwardly from the lip of the lid and project outwardly from the tray portion and align such that they overlap with each other.

a. Tray

The tray forms the bottom of the container. The tray is generally leak-resistant. The tray can have any suitable shape and dimensions, but generally corresponds with the shape and dimensions of the lid so that they are able to close and lock in the closed position.

The tray generally has a substantially trapezoidal shape formed from a rectangular bottom panel and two substantially upstanding pairs of opposing tray panels, which correspond with four pairs of adjacent tray panels. Each of the tray panels is attached to one side of the bottom panel and protrudes upwards from the bottom panel. Each pair of adjacent tray panels is hingedly connected in a liquid tight manner with a folded gusset that is unitary with each of the adjacent tray panels in the pair. The gusset is secured by an adhesive to the exterior surface of one of the side panels in the pair. Optionally, the gusset can be inside the tray and secured by an adhesive to an interior surface of one of the side panels in the pair.

One pair of opposing tray panels forms the front tray panel and the rear tray panel. The rear tray panel is hingedly attached via a fold line to the rear lid panel.

The other pair of opposing tray panels forms the two opposing side tray panels.

The front tray panel is optionally taller than the other panels in the tray. The front tray panel typically includes an extension portion, which extends beyond the height of the side tray panels, when the tray is assembled. The extension portion is foldably connected to the front panel along a fold line. The extension portion terminates in one or more tabs, such as a tuck tab or hook tab, that mates with a corresponding slit on the top panel of the lid. The extension portion can have any suitable size and shape that allows the tab located at its end to be inserted into the slit located in the top panel of the lid. In some embodiments, the extension portion has a substantially triangular shape. In other embodiments, the extension portion has a substantially rectangular shape. One or more fold lines typically connect the tab to the extension portion. When in the closed and locked position, the extension portion lays in front of the front lid panel, and bends along the fold line, allowing the tab to lay on top of the top panel of the lid and be inserted into the slit on the top panel.

In some embodiments, the height ($H_e$) of the extension portion of the tray is substantially the same as or similar to the height ($H_L$) of the lid front panel. The height of the extension portion is the distance from the fold line between the front tray panel and the extension portion to a fold line between the tab and the extension portion. (see, e.g. FIG. 15, $H_e$ is the distance between fold line 313" and fold line 315").

Optionally, the height of the extension portion is smaller than the height of the front lid panel. Typically this relationship is present when the lid and tray include interlocking detents, which lock in a manner that pulls the lid downward so that the lid detents are below the corresponding tray detents.

i. Gusset Corners

Each gusset comprises a pair of gusset panels, containing a first gusset panel and a second gusset panel, separated by a fold line. Optionally, one gusset panel includes a slot or opening, which facilitates adhering the gusset to the exterior surface of one of the side panels, the front panel, or the rear panel.

ii. Tray Detents

Optionally, the tray includes a pair of detents. In some embodiments, the pair of tray detents protrude either beyond the plane of the front tray panel and from the end of each side wall or beyond the plane of the respective side wall and from each end of the front tray panel. In some embodiments, the pair of tray detents includes one detent located on each corner of an extension portion of the front tray panel, generally located at the bottom of the extension portion. In this embodiment, the lid contains a second pair of detents on the front lid panel that are in the same plane as the front lid panel and align with the first pair of detents. The lid and the tray detents are configured to contact each other when the container is in the closed position, such that the tray detents mate with the lid detents and lock the front lid panel and tray front panel together. In the locked position, the lid detents are in a first plane and tray detents are in a second plane where the first and second planes intersect at an acute angle that is less than 90°, typically less than 30°, less than 20°, less than 10°, and optionally between 0° and 5°, or between 0° and 10°, or smaller than 5°.

b. Lid

The lid forms the top of the container. The lid can have any suitable shape and dimensions, but generally corresponds with the shape and dimensions of the tray so that they are able to close and lock in the closed position. The lid generally has a substantially trapezoidal shape formed from a rectangular top panel and two pairs of opposing lid panels, which correspond with four pairs of adjacent lid panels. Each of the lid panels is attached to one side of the top panel and protrudes downwards from the top panel. The top panel can be substantially flat or curved, forming a lid with a dome-shape. Each pair of adjacent lid panels is connected to its adjacent lid panel via a glue tab, which is unitary with one of the lid panels and secured by an adhesive to the other of the lid panels in the pair. The glue tab is secured by an adhesive to the interior surface of one of the side panels in the pair.

One pair of opposing lid panels forms the front lid panel and the rear lid panel. The other pair of opposing lid panels forms the two opposing side lid panels.

The front lid panel is defined by a top edge, two side edges, and a lower border. The height of the front lid panel ($H_L$) is the distance from the lower border of the front lid panel to top edge (see, e.g. FIG. 3, $H_L$ is the distance from the fold line 211', which forms the top edge when the container is assembled, to the lower border 293' of the lid front panel).

In some embodiments, the front lid panel includes a recessed portion. The recessed portion can be configured to facilitate alignment of a corresponding extension portion on the tray and/or locking of the lid and the tray in the closed position. In embodiments in which the front lid panel includes a recessed portion, the front lid panel is defined by a top edge, two side edges, and the recessed portion defined by an upper border, two side borders, a first portion of the lower border, and a second portion of the lower border, where each portion of the lower border is connected to one of the side borders. Each portion of the lower border is substantially parallel to the upper border. Typically the upper and lower borders are straight. The side borders can be straight or curved.

The top panel of the lid typically includes a slit or slits, which is one component in a locking mechanism. The slit or slits have a suitable shape and size to receive a tab or portions of a tab that is attached to the tray, and thereby lock the lid and tray together in the closed position, to aid in transport of the materials, such as food, inside of the container.

i. Adhesive

An adhesive secures the gussets to the tray panels and secures the glue tabs to the lid panels. The adhesive that secures the gussets to the tray panels and that secures the glue tabs to the lid panels is preferably a food grade adhesive. The selection of the particular adhesive placed on the blank during assembly of the container depends on the capability desired for the carton (e.g. microwavable, oven safe and/or refrigerator safe). Preferably, the adhesive resists melting upon exposure to high temperature and when exposed to microwave or other heat radiation. This allows food to be safely heated in a microwave or convection oven, and the container to retain its assembled configuration. Suitable adhesives include but are not limited to CH-25 hot melt adhesive and AP0283WE liquid adhesive.

In some embodiments, the gussets adhere to the tray panels and/or the glue tabs adhere to the lid panels by thermal bonding (e.g. heat seal). Optionally, the gussets adhere to the tray panels by an adhesive described above or by thermal bonding, or a combination thereof, and the glue tabs adhere to the lid panels by an adhesive described above. For example, the interior and exterior surfaces of the tray panel is coated with a heat sealable coating, such as a food grade heat sealable coating. Once the gussets are folded to contact an interior or exterior surface of the tray panels, the folded gussets adhere to the tray panel by applying heat to the gusset to form bonding between the contacted surfaces. In some embodiments, the heat sealable coating is only on the interior surface of the tray panel. In some embodiments, the heat sealable coating is located only on the interior or exterior surface of the gussets and the portion of the interior or exterior surface to which they adhere.

ii. Recessed Portion

Optionally, the front panel of the lid includes a recessed portion. The recessed portion is defined by an upper border, two side borders, a first portion of the lower border, and a second portion of the lower border, where each portion of the lower border is connected to one of the side borders. Each portion of the lower border is substantially parallel to the upper border. Typically the upper and lower borders are generally substantially straight. Optionally, the front lid panel contains two front corners, where each corner is located on one side of the recessed portion.

The side borders can be straight or curved. The side borders are typically mirror images of each other. In some embodiments, each of the side borders is substantially straight and intersects the lower border at an angle of at least 90°, typically at an angle of greater than 90°. In some embodiments, each of the side borders is curved and protrudes inwardly, extending over a portion of the upper border in the form of side tabs. If corresponding tray detents are present on the container, these side tabs can function as interlocking lid detents.

Figure 15:
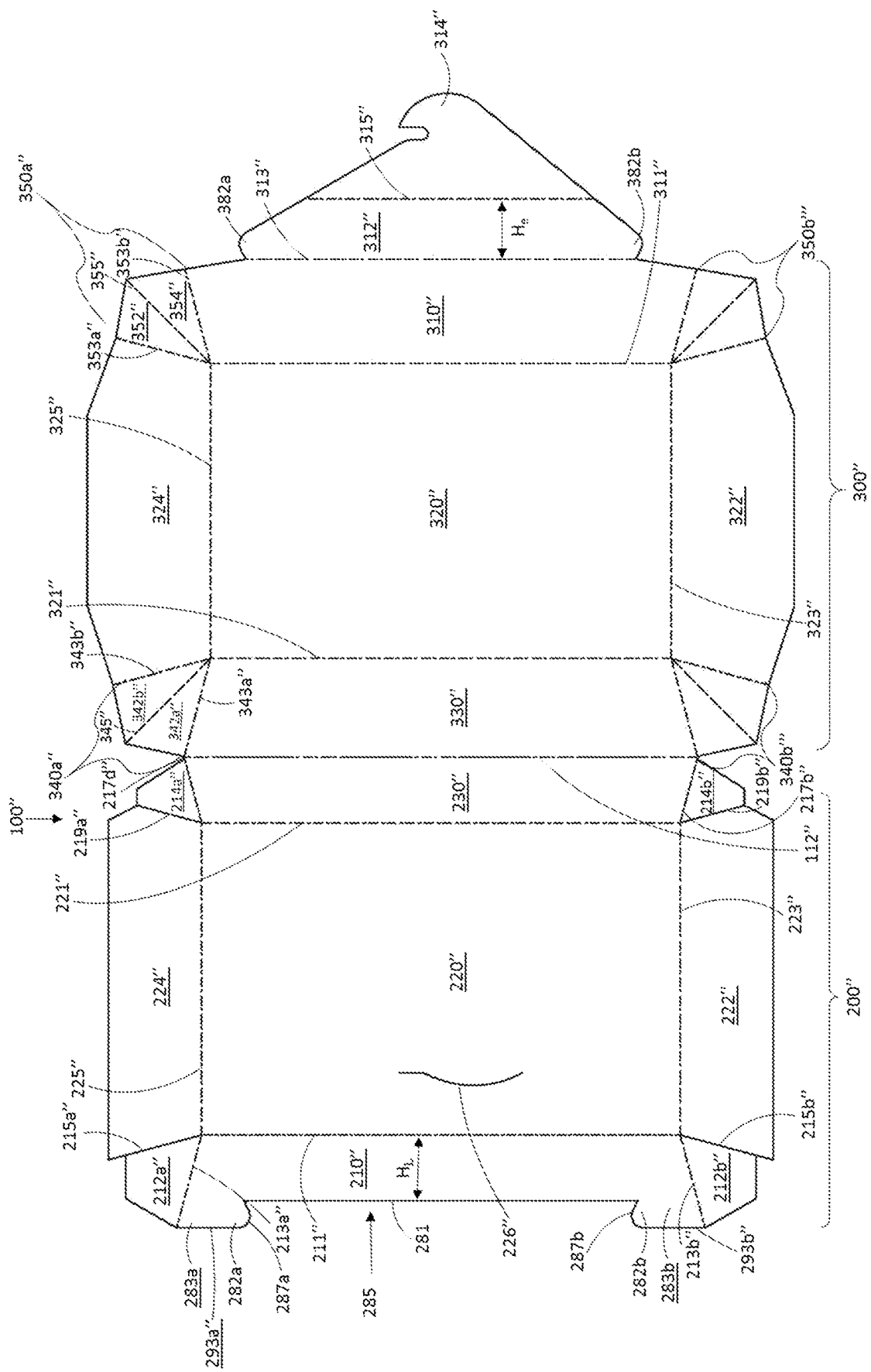
FIG. 15 is a plan view of an exemplary blank configured to form a clamshell container with a lid and a tray, where the tray has a rectangular bottom panel and corresponding tray detents, and the lid has a rectangular top panel and corresponding lid detents.

For lids that contain a recessed portion, the height of the front lid panel ($H_L$) can be measured from the upper border of the recessed portion to the top edge of the front lid panel (see, e.g. FIG. 15, $H_L$ is the distance from fold line 211" to the upper border 281 of the recessed portion 285).

iii. Lid Detents

Optionally, the lid includes a pair of lid detents. In some embodiments, the pair of detents protrude either beyond the plane of the front lid panel and from the end of each side wall or beyond the plane of the respective side wall and from each end of the front lid panel. In some embodiments, the pair of lid detents are located in the recessed portion of the front lid panel and protrude from each of the sides, with their outer border forming each of the side borders.

The lid and the tray detents are configured to contact each other when the container is in the closed position, such that the tray detents mate with the lid detents and lock the front lid panel and tray front panel together. In some embodiments in the locked position, the lid detents and tray detents are aligned in planes that intersect at an angle of less than 90°, such as an angle of less than 45°, typically less than 45°, such as less than 30°, less than 20°, such as between greater than 0 and 25°, greater than 0° and 20°, greater than 0° and 15°, greater than 0° and 10°, greater than 0° and 5°. In some embodiments in the locked position, the lid detents and tray detents are aligned in substantially perpendicular planes.

c. Optional Features i. Opening Forming a Window in Lid and/or Tray

Optionally, the lid and/or tray includes one or more openings that allows one to view the contents in the interior of the clamshell carton and/or permit assessment of the food item or items inside the clamshell carton when the clamshell carton is assembled from the blank and when the container is in a closed position. The food item(s) or other item(s) can be disposed directly in the clamshell carton. The opening can be covered by a film, plastic, or other covering made of a transparent material that forms a window to allow the items inside the carton to be viewed or otherwise inspected or assessed therethrough, even when the container is in a closed position. Suitable materials include acetate film (e.g. 1 mil. thick), polyester film (e.g. 1 mil. thick), or anti-fog polypropylene film (e.g. 1 mil thick). Depending upon whether to carton is desired to be microwaveable, oven safe and/or refrigerator safe, different materials may be chosen to cover the opening.

Figure 26:
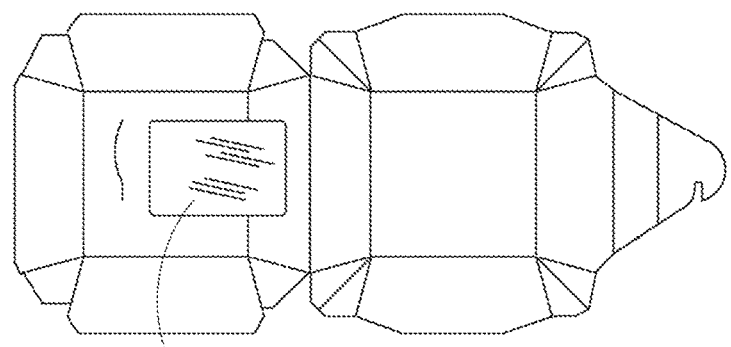
FIG. 26 shows a plan view of an exemplary blank for forming a container with a square lid and a square tray with a window in the top and rear lid panels, and a locking mechanism. The locking mechanism contains a belt formed by an extension portion attached to the tray that terminates in a hook, which is insertable into a slit in the top panel of the lid when the container is assembled.
Figure 27:
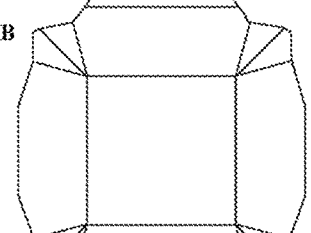
FIG. 27 shows a plan view of an exemplary blank for forming a container with a square lid and a square tray with a circular window in the top lid panel, and a locking mechanism. The locking mechanism contains a belt formed by an extension portion attached to the tray that terminates in a tab, which is insertable into a slit in the top panel of the lid when the container is assembled.

The opening can have any suitable shape, size, and configuration. The opening can be located in a variety of different locations. The opening can be in a regular shape, such as a rectangle, square, oval, circle, etc. The opening can be in an irregular shape. The opening may be located in the lid, such as on the top panel (see, e.g. FIG. 14, opening 410 and FIG. 27, opening 410'), on one or both of the side lid panels, on the front lid panel, and/or on the rear lid panel (see, e.g. FIGS. 12A and 12B, opening 420, and FIGS. 26A and 26B, opening 420'). The opening will generally not be located where a slit is present. The opening may be located in the tray, such as on the bottom panel, on one or both of the side tray panels, on the front tray panel, and/or on the rear tray panel. In some embodiments, the top panel includes an opening and the rear lid panel and/or front tray panel includes an opening for viewing the contents. FIGS. 13 and 27 show exemplary blanks with a single opening 430 and 430' respectively in both the top and rear lid panels that forms a window in the lid of the resulting container.

Optionally, the opening can contain multiple openings, which can be covered by a single covering or which can be covered by multiple coverings, or the opening can be a single opening covered by more than one covering.

ii. Identifying Markings on Lid and/or Tray

Optionally, the lid and/or tray include identifying markings, such as to indicate the direction the container should be placed to prevent accidental spillage of the food contents (e.g. with an arrow or "this side up" marking). Logos or other decorative or informative markings can also be included on the lid or tray, as desired.

iii. Vents for Release of Heat and/or Steam

Optionally, one or more panels in the container contain vents to allow heat and steam to escape. The vents can be formed from a single cut, such as illustrated in FIGS. 9A and 9B.

Optionally, the lid and/or tray include relief cuts on the fold line connecting the lid portion and tray portion of the container. The relief cuts allow for heat and steam to escape from the container, when the container is in the closed position and when a hot substance, such as hot food, is enclosed therein.

Generally, the relief cuts may be a single cut located on the rear lid panel or on the rear tray panel, or multiple cuts located on the rear lid panel and/or on the rear tray panel. In some embodiments, the cuts can be arranged in pairs, i.e. one of the relief cuts is located on the rear lid panel and another one is located on the rear tray panel, where the pair of cuts meet to form a V-shape centered on the fold line that connects the lid portion and the tray portion. In some embodiments, one of the relief cuts is located on the rear lid panel and another is located on the rear tray panel, where the two cuts are arranged parallel to each other.

The container may have multiple pairs of cuts arranged in the same fashion or different fashions.

iv. Zipper or Perforated Line for Unlocking the Container

Optionally, the tray and/or lid contains one or more zipper(s) or a perforated line on the front and/or rear of the container. Typically, the zipper is arranged on the tray and/or lid such that it above the corners of the tray. For example, the extension portion of the front tray panel, a connecting region above the extension portion and below the tab, and/or the rear lid panel includes a zipper or a perforated line to facilitate the opening of a locked container. In some embodiments, the zipper or perforated line is located on the extension portion of the front tray panel (see, e.g. FIG. 31A, zipper 1010, FIG. 31B, zipper 1010', and FIGS. 32A and 32B, zipper 1010") or on the rear lid panel (see, e.g. FIG. 31C, zipper 2010'). FIGS. 31A, 31B, 32A, and 32B may be modified to include the zipper in the connecting region 1030, 1030', and 1030" above the fold line connecting the extension portion and the tab. Although not shown, a zipper can be incorporated on the tray and/or lid of any one of the containers described herein, such as on the extension portion, in the connecting region, and/or on the rear lid panel.

Figures 31A, 31B, 31C:
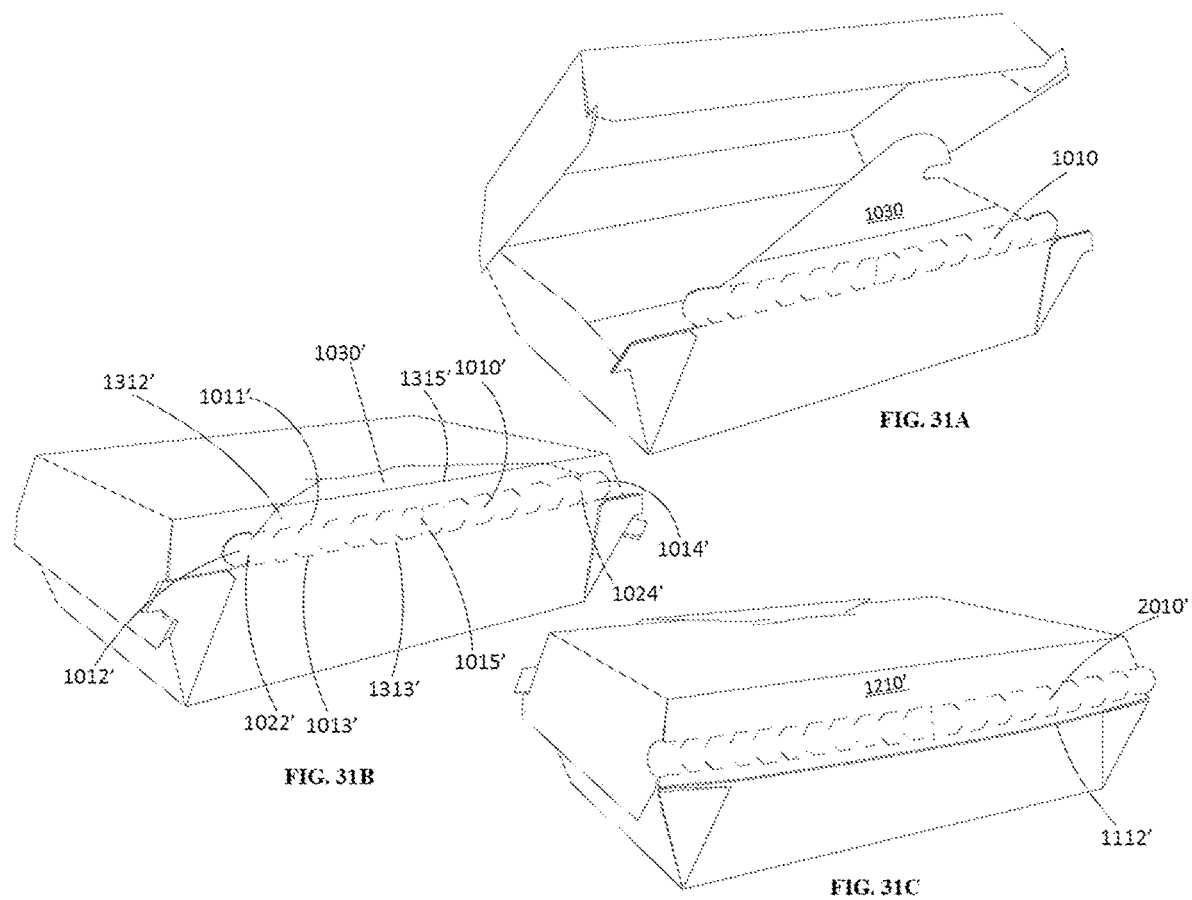
FIGS. 31A-31C are various views of the clamshell container that forms when the blank depicted in FIG. 1 with a modification of the gussets as shown in FIG. 2B is assembled (however the tabs at each end of the zipper on the extension portion are rounded). When the clamshell container is assembled, the tray detents are double ply and the corresponding gussets are attached to the front panel.

Typically, the zipper is formed by two perforated line(s), such as two parallel perforated lines. The zipper can have any suitable shape and dimensions. When the zipper is located in the extension portion, its lengths are the distances between a first edge of the extension portion and a second edge of the extension portion in the region of the extension portion in which the zipper is located. As the extension portion can have a trapezoidal shape, the length of the zipper portion varies from a first longest length to a second shortest length. The zipper can include a pull-tab on one end or both ends of the zipper. For example, the zipper can include a single pull-tab on one end of the zipper. Alternatively, the zipper can include two pull-tab(s), where a first pull-tab is on a first end of the zipper and a second pull-tab is on a second end of the zipper. For example, as shown in FIG. 31B, the zipper 1010' is formed by two perforated lines 1011' and 1013' and includes two semicircular pull-tabs 1012' and 1014'; a first pull-tab 1012' is located on a first end 1022' of the zipper and a second pull-tab 1014' is located on a second end 1024' of the zipper. The pull-tab can have any suitable shape and dimensions as long as a user can pull on the pull-tab and thereby remove the zipper from the container. Exemplary shapes for the pull-tab are circles (e.g. full circle, semicircle, ¾ circle, etc.), triangle, square, rectangle, and polygons, and combinations thereof, such as semicircles (see, e.g., FIG. 31B, 1012' and 1014') and polygons (see, e.g., FIGS. 32A and 32B, 1012" and 1014").

The zipper can include one or more additional cut line(s) on the zipper, such as located on one side of the zipper and/or in the middle of the zipper to facilitate removal of the zipper from the container. For example, cut line 1015' is arranged perpendicularly to each perforated line 1011' and 1013' and located in the middle of the zipper 1010' such that a user can remove the zipper from the extension portion 1312' by pulling either end of the zipper.

Optionally, the lid or the tray contains only one perforated line on the front and/or only one perforated line on the rear to allow easy opening of the lid from the tray. The perforated line can be located on the front of the container, such as anywhere on the extension portion, at the fold line connecting the extension portion and the tab, at the fold line connecting the extension portion and the front panel, or in the region connecting the extension portion and the tab. The perforated line can be located on the rear of the container, such as anywhere on the rear lid panel or at the fold line connecting the rear tray panel and the rear lid panel. For example, although not shown in FIGS. 31B and 31C, the perforated line can locate anywhere on the extension portion 1312', at fold line 1315', at fold line 1313' (which overlaps with perforated line 1013'), in the connecting region 1030', on the rear lid panel 1210', and/or at fold line 1112'. The perforated line can be incorporated on the tray and/or lid of any one of the containers described herein, such as on the extension portion, at the fold line connecting the extension portion and the tab, at the fold line connecting the extension portion and the front panel, in the region connecting the extension portion and the tab, on the rear lid panel, and/or at the fold line connecting the rear tray panel and the rear lid panel.

d. Locking Mechanism

The lid and tray are able to be secured in the closed position via one or more locking mechanisms. The container includes at least one locking mechanism. Optionally, the container includes two or more locking mechanisms.

i. Tab in Slit

One locking mechanism includes a slit in in the top panel of the lid and a front tray panel with an extension portion that terminates in one or more tabs with any suitable geometry that allows the tab to be inserted into the slit on the lid to lock the lid and tray in the closed position.

The top panel contains a slit which corresponds to the size and shape of the corresponding tab.

Figure 9C:
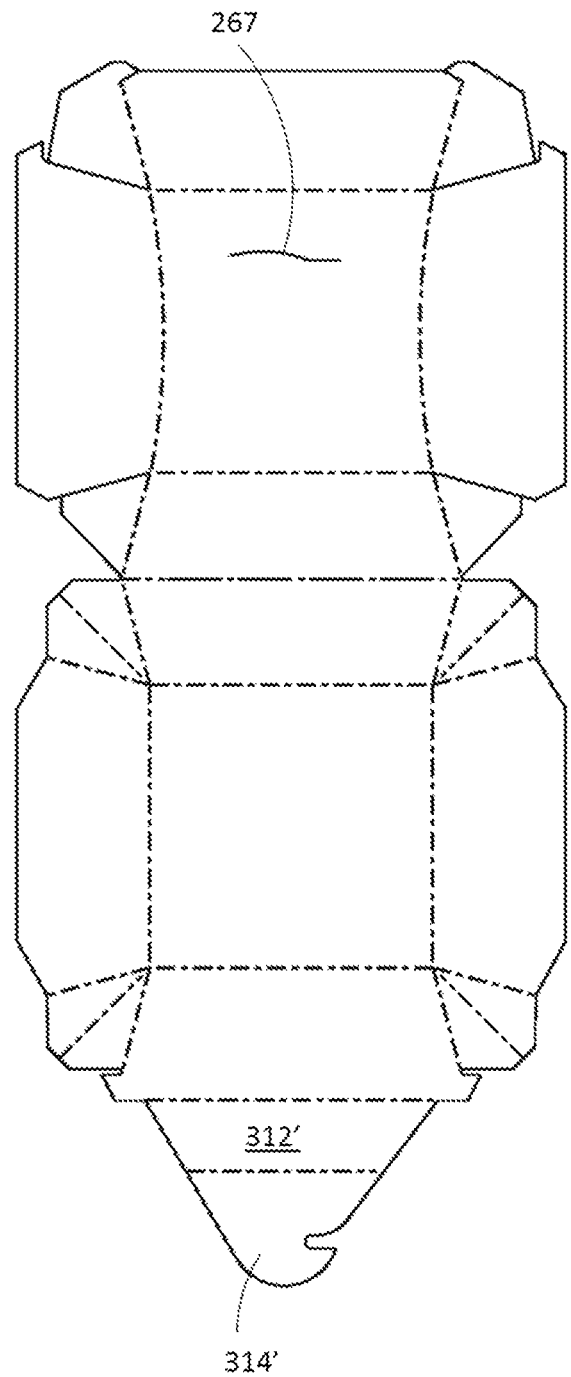
Figure 29:
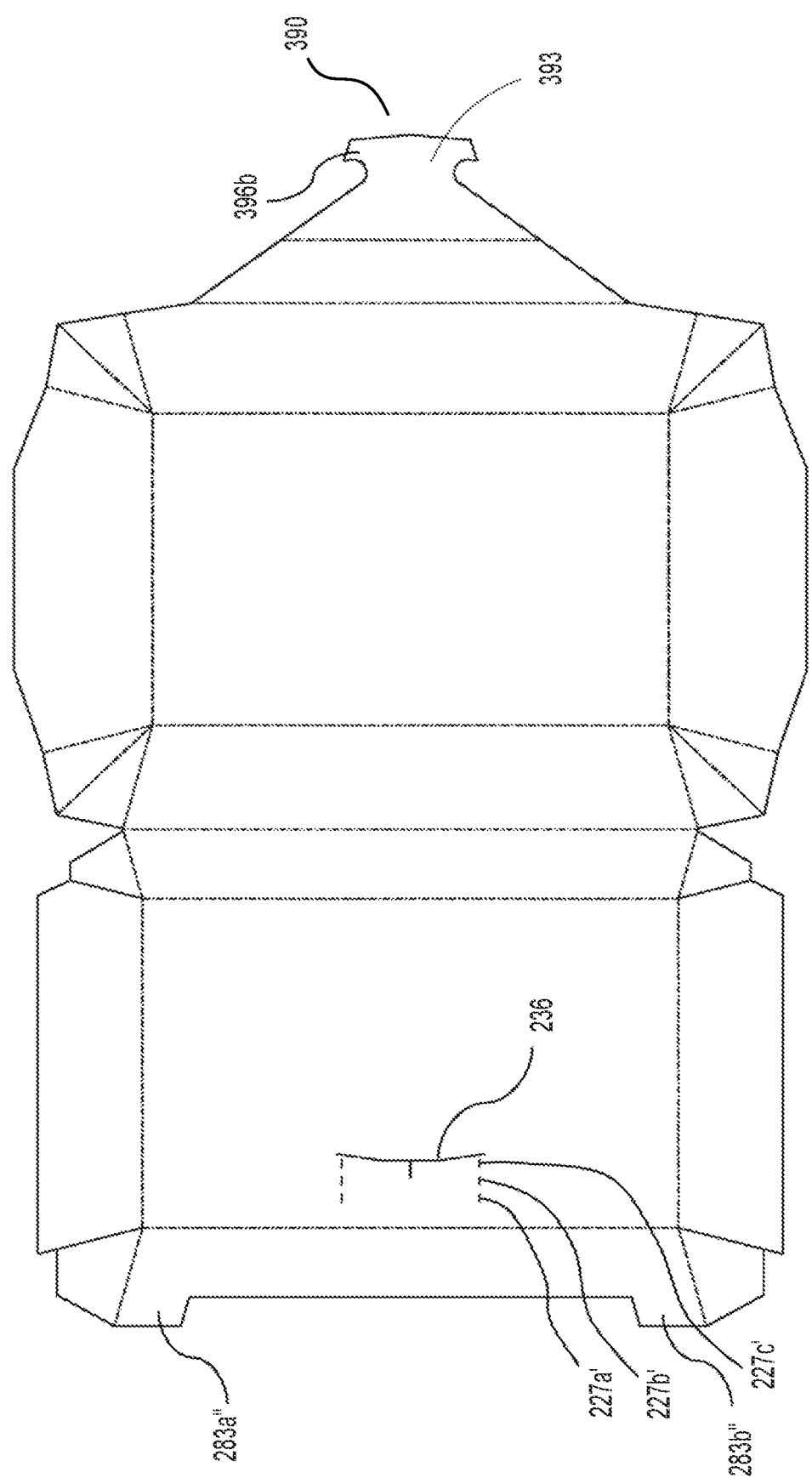
FIG. 29 is a plan view of an exemplary blank configured to form a clamshell container with a lid, a tray, and a locking mechanism, where the tray has a rectangular bottom panel, and the lid has a rectangular top panel and a recessed front panel. The locking mechanism contains a belt formed by a triangular shaped extension portion attached to the tray that terminates in a tab containing two flaps, which is able to insert into a slit in the top panel of the lid, when the container is assembled. The tab has two flaps, which fit into a curved slit on the top panel of the lid.

The tab can have any suitable size and shape that is configured to fit inside the corresponding slit on the top panel of the lid. Suitable tabs include hook tabs, such as a right hook tab, a left hook tab, or a double hook tab, tuck tabs, and other suitable types of tabs. Exemplary tabs are shown in FIGS. 9A-9F, 23A-23D, and 29. As shown in FIGS. 9B-9D and 23B-23D, the hook may be a right hook (314' in FIG. 9C and 314''' in FIG. 23C) or a left hook (347 in FIG. 9B, 357 in FIG. 9D, 347' in FIG. 23B, and 357' in FIG. 23D). As shown in FIG. 9E, the hook may be a two-sided hook 329, with a right hook 331a attached to a left hook 331b via a curved connecting portion 333. Exemplary double sided push tabs are illustrated in FIGS. 9A, 9F, 24A and 30. As shown in FIGS. 9A and 24A, the tab can have two flaps (337a and 337b in FIG. 9A, and 337a' and 337b' in FIG. 23A) that fit inside two correspondingly shaped slits. As shown in FIG. 29, the tab 390 can have two flaps, with a right flap 396a attached to a left flap 396b via a connecting portion 393, which fit into a slit 236.

Figure 9D:
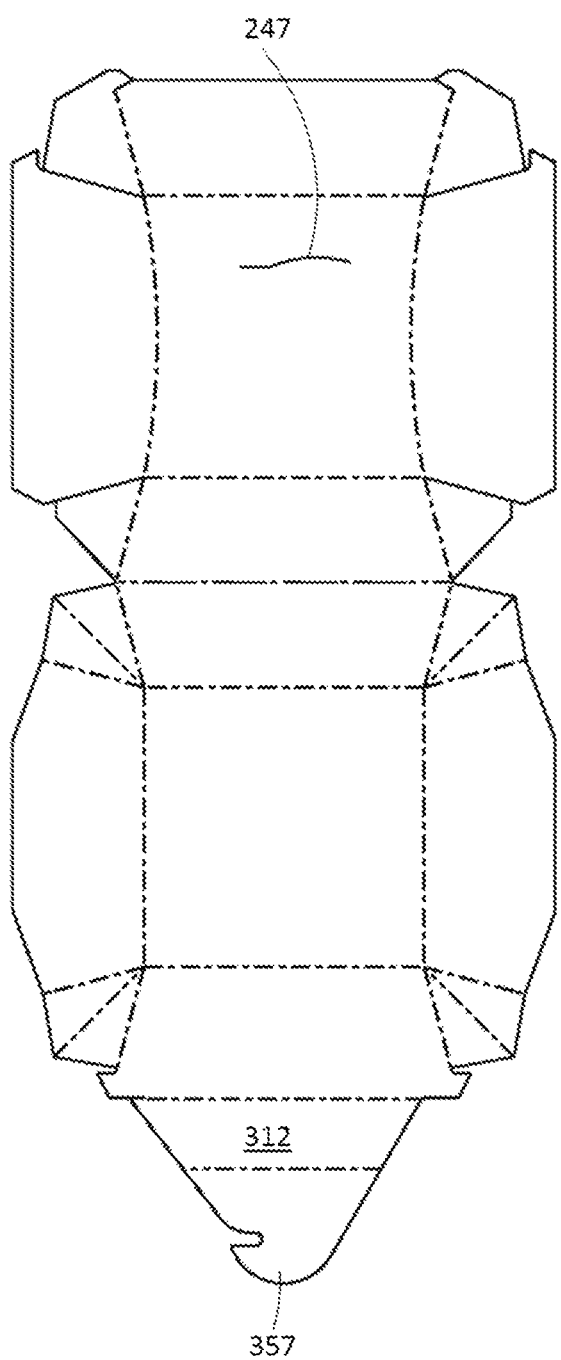
Figure 11A:
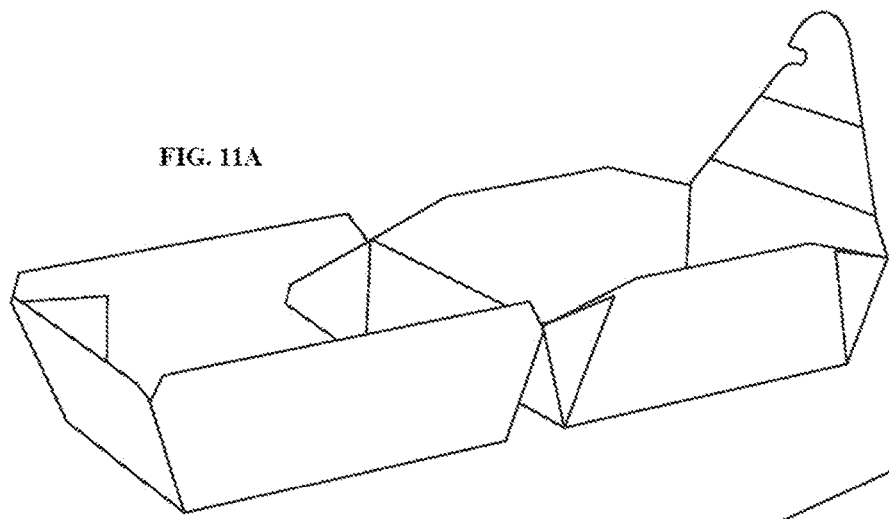
FIGS. 11A-11C show perspective views of a container with an extension portion, tab and slit for a locking mechanism, without a detent-based locking mechanism. The container is shown in the open position (FIG. 11A), the closed and locked position (FIG. 11B), and closed and unlocked position (FIG. 11C).
Figure 11B:
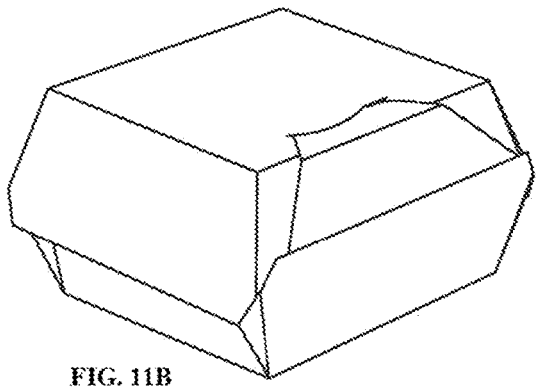
Figure 11C:
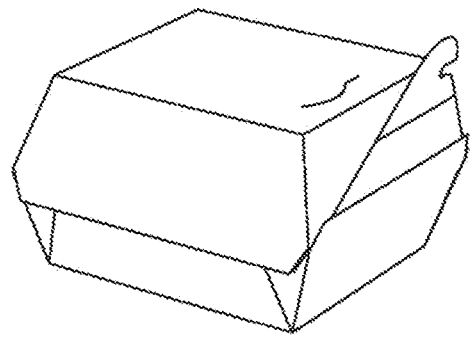

The slit can be a single cut line having a suitable shape and size to receive the corresponding tab, such as a curved cut line (convex or concave), a straight cut line, or other suitable shapes to receive the corresponding tab. Optionally, one or more additional cut lines are arranged perpendicularly to the slit, such as located on each side of the slit, in the middle of the slit, or on each side and the middle of the slit. The additional cut lines are configured to facilitate removal of the tabs from the slit. Exemplary slits are shown in FIGS. 9A-9F, 23A-23D, and 30. As shown in FIGS. 9B and 9D, slit 247 may be a single cut curved line terminated with a straight line on the left end to receive the left hook tab 347. As shown in FIGS. 9C and 24C, slit 267 is a mirror image of slit 247 to receive the right hook tab 314'. As shown in FIGS. 9A, slits 237a and 237b are two rectangular cut outs configured to receive the two flaps 337a and 337b of the corresponding tab 335. As shown in FIG. 9E, slit 377 is a single curved cut line to receive the corresponding tab 329. As shown in FIG. 9F, slit 226' is a single curved cut line to receive the two corresponding tabs 319a and 319b. Additional cut lines 227a and 227b are arranged perpendicularly to slit 226', such as located on each side of the slit and configured to facilitate removal of the tabs from the slit. As shown in FIG. 29, slit 236 is a single curved cut line to receive the two flaps of tab 390.

Additional cut lines 227'a, 227'b, and 227'c are arranged perpendicularly to slit 236, such as located on each side and in the middle of the slit and configured to facilitate removal of the tabs from the slit.

ii. Locking Detents

Another locking mechanism includes cooperating pairs of latching members on the front of the lid and the tray. Optionally, the latching members are located on the front corners of the lid, located generally at the bottom of the lid and the front corners of the tray, located generally at the top of the tray. In other embodiments the latching members are located on the lower portion of the front lid panel and adjacent to a recessed portion of the front lid panel while the corresponding latching members on the tray are protrude from the sides of an extension portion attached to the front tray panel.

1. Perpendicular Detents

In some embodiments, each latching member on the lid is perpendicular to a corresponding latching member on the tray. For example, each of the latching members on the lid can be a single layer or double layer tab, which function as a detent, that is in the same plane as one of the side panels of the lid and protrudes outwardly from the lid, and each of the corresponding latching members on the tray can be can be a single layer or double layer tab, which function as a detent, that is in the same plane as front panel of the lid and protrudes outwardly from the lid.

In one embodiment, the tray contains a first pair of tabs, which function as a pair of detents, protruding from the upper corners of the front tray panel, and the lid contains a second pair of tabs, which function as a pair of detents, that are aligned perpendicular to the first pair of detents. The second pair of detents contains one detent protruding from the lower corner of one side lid panel and the second detent protruding from the lower corner of the second side lid panel. The first and second pairs of detents are configured to contact each other when the container is in the closed position, such that the first pair of detents lies on top of the second pair of detents.

In another embodiment, the tray contains a first pair of tabs, which function as a pair of detents, protruding from the upper corner of each of the side tray panels, and the lid contains a second pair of tabs, which function as a pair of detents, that are aligned perpendicular to the first pair of detents and protrude from the lower corners of the front lid panel. The first pair of detents contains one detent protruding from the upper corner of one side tray panel and the second detent protruding from the upper corner of the second side tray panel. The first and second pairs of detents are configured to contact each other when the container is in the closed position, such that the first pair of detents lies on top of the second pair of detents.

2. Detents in the Lid and Tray that Interlock Along the Front of the Container

In some embodiments, locking mechanism can include cooperating pairs of latching members on the front lid panel and their corresponding latching members on and extension portion attached to the front tray panel. For example, the tray contains an extension portion that extends from the front tray panel and includes a first pair of tabs, that function as a pair of detents, and protrude from each side of the extension portion, generally located at the bottom of the extension portion (adjacent to or near the fold line between the front tray panel and the extension portion), and the lid contains a second pair of tabs, that function as a pair of detents, on the front lid panel where each tab is located at an opposite end of the front lid panel and in a recessed portion of the front lid panel. The second pair of detents on the lid is configured to contact the first pair of detents on the tray when the container is in the closed position, such that the first pair of detents mates with and lies above the second pair of detents and locks the container in the closed position.

II. Paperboard Blank

A paperboard blank is used to form the single use, disposable paper clamshell container described herein.

The blank is formed from a foldable material, such as paper-based material such as paperboard or corrugated sheet material, although other materials may be used if desired. In embodiments utilizing paperboard, the paperboard may be virgin or recycled material, may be coated or uncoated, and may be single-ply or laminated paperboard.

The foldable material may be Folding Box Board (FBB). FBB is a chemically and mechanically generated multiply pulp material making it strong and durable. FBB includes a bleached chemical layer.

The foldable material may be Solid Bleached Sulfate (SBS) Board. This type of board is formed by chemically pulping fibers and then bleaching it. The bleached pulp is refined and formed into boxes. SBS boxes generally contain white surfaces on the inside and outside of the box. SBS can be coated on only one side (CIS) or on both sides (C2S).

FBB and SBS board are produced from virgin fibers and are generally suitable for all types of product packaging.

SBS board quality also allows special processes such as embossing & debossing, hot foil stamping or spot UV printing due to its grade quality.

The foldable material may be Natural Kraft or Coated Unbleached Kraft (SUS or CUK). This type of board is made from 100% recyclable materials, and is often used for kraft packaging. When coated with polyethylene (PE) resin, this board can be used to make food packaging of wet strength. At least 80% of virgin unbleached wood pulp is used to make CUK. This type of board is strong and durable; the stiffness leads to high resistance to tearing making the board long-lasting. The printing quality of the board can be improved by coating the surface with a thin layer of kaolin clay.

The foldable material may be from about 0.012 inch to about 0.024 inch thick, although it may have any suitable thickness.

In some embodiments, the foldable material may be solid bleached sulfate (SBS) with ½ mil low density polyethylene (LDPE), while in other embodiments the foldable material may be SBS with ¾ mil LDPE, while in still yet other embodiments, any other suitable foldable material may be used.

Different types of food grade paperboard may be used to form the blank and ultimately the container. The paperboard is optionally ovenable paperboard suitable for use in conventional and microwave ovens.

The paperboard may be coated with a suitable food grade material to reduce leakage, such as a polyester resin film. Optionally, the side of the paperboard blank that forms the inside surface of the resulting tray is coated with a liquid impervious polymer film. Optionally, the blank is coated on one side, which will serve as the inside surface of the resulting container, with a clay-coat, which is cured with a UV or electron beam varnish.

The paperboard blank contains a plurality of score lines that define a central polygonal bottom panel (referred to as the tray portion), which forms the bottom of the tray when it is assembled, and a central polygonal top panel (referred to as the lid portion) that forms the lid when the blank is assembled. The lid portion and the tray portion are connected via a fold line.

a. Tray Portion of the Blank

Some of the score lines on the tray portion form a plurality of bottom edges, defining the bottom panel and also serve as the bottom edge of each of the tray panels. Four tray panels extend outward from the bottom panel. The bottom edges can be folded to assemble the tray panels, such that they are angled away from the bottom panel at an angle greater than 90° when the tray is assembled.

In some embodiments, the bottom panel is in the shape of a rectangle. In some embodiments, the bottom panel is in the shape of a square. However, the bottom panel may be in the shape of other polygons.

In the tray, each tray panel is attached to an adjacent tray panel via a pair of triangular-shaped gusset panels. In a pair of gusset panels, each gusset panel shares a side with the other gusset panel, and this shared side also serves as a first fold line. Thus, each gusset panel is attached to the other gusset panel in the pair via the first fold line. Each gusset panel in the pair is also attached to the adjacent tray panel (which can be a side tray panel, a front tray panel, or a rear tray panel) via a second fold line. The second fold line is at a suitable angle for forming a tray with the tray panels, each of which extend from the bottom panel, at an angle of greater than 90°, typically at an angle ranging from 100° to 120° when the tray is assembled.

b. Lid Portion of the Blank

Some of the score lines on the lid portion form a plurality of top edges, defining the top panel and also as the top edge of an each of the lid panels. Four lid panels extend outward from the top panel. The top edges can be folded to assemble the lid panels, such that they are angled away from the top at an angle greater than 90° when the lid is assembled.

In some embodiments, the top panel is in the shape of a rectangle. In some embodiments, the top panel is in the shape of a square. However, the top panel may be in the shape of other polygons. Further, the lid can be substantially flat or curved. Optionally, the lid is curved, such as in the shape of a dome.

Each lid panel is typically attached to an adjacent lid panel via a glue tab. The glue tabs are typically attached to the front lid panel or rear lid panel via a fold line. In this embodiment, the glue tabs are adjacent to but disconnected from the adjacent side panel. Alternatively, the glue tabs can be attached to each of the side panels via a fold line. In this embodiment, the glue tabs are adjacent to but disconnected from the front lid panel or rear lid panel. The fold line is at a suitable angle for forming a tray with the adjacent lid panels, each of which extend from the bottom panel, at an angle of greater than 90°, typically at an angle ranging from 100° to 120° when the tray is assembled.

The front lid panel is defined by a top edge, formed by the fold line between the top panel and the front lid panel, two side edges formed when the pair of glue tabs are attached to the front lid panel, and a lower border.

In some embodiments, the front lid panel includes a recessed portion. The recessed portion can be configured to facilitate alignment of a corresponding extension portion on the tray and/or locking of the lid and the tray in the closed position. In embodiments in which the front lid panel includes a recessed portion, the front lid panel is defined by a top edge, formed by the fold line between the top panel and the front lid panel, two side edges formed when the pair of glue tabs are attached to the front lid panel, and a recessed portion defined by an upper border, two side borders, a first portion of the lower border, and a second portion of the lower border, where each portion of the lower border is connected to one of the side borders. Each portion of the lower border is substantially parallel to the upper border. Typically the upper and lower borders are straight. The side borders can be straight or curved. Optionally, the front lid panel contains two front corners, where each corner is located on one side of the recessed portion (see, e.g. FIG. 29, 283*a*" and 283*b*"). The front corners are configured such that when the container is in the closed position, the front corners lie on top of a portion of the front tray panel (see, e.g. FIGS. 30B and 30C, 283*a*" and 283*b*").

Optionally, the side borders are curved and include tabs that protrude inwardly. These tabs can function as lid detents that interconnect and lock with corresponding tray detents.

In some embodiments, the pair of glue tabs that are attached to the front lid panel contain a tab portion. Optionally, the edge of each adjacent side panels that is proximal to the front lid panel also contains a correspondingly shaped tab portion. The tab portions on the front lid panel can align with a correspondingly shaped tab portions on the adjacent side lid panels to form a pair of bi-layer or double-ply lid detents, which mate with the corresponding tray detents to serve as a locking mechanism when the container is in the closed position. Optionally, either the lid side panels or the front lid panel do not contain tab portions. In this embodiment, the lid detents are single layer or single-ply.

Figure 3:
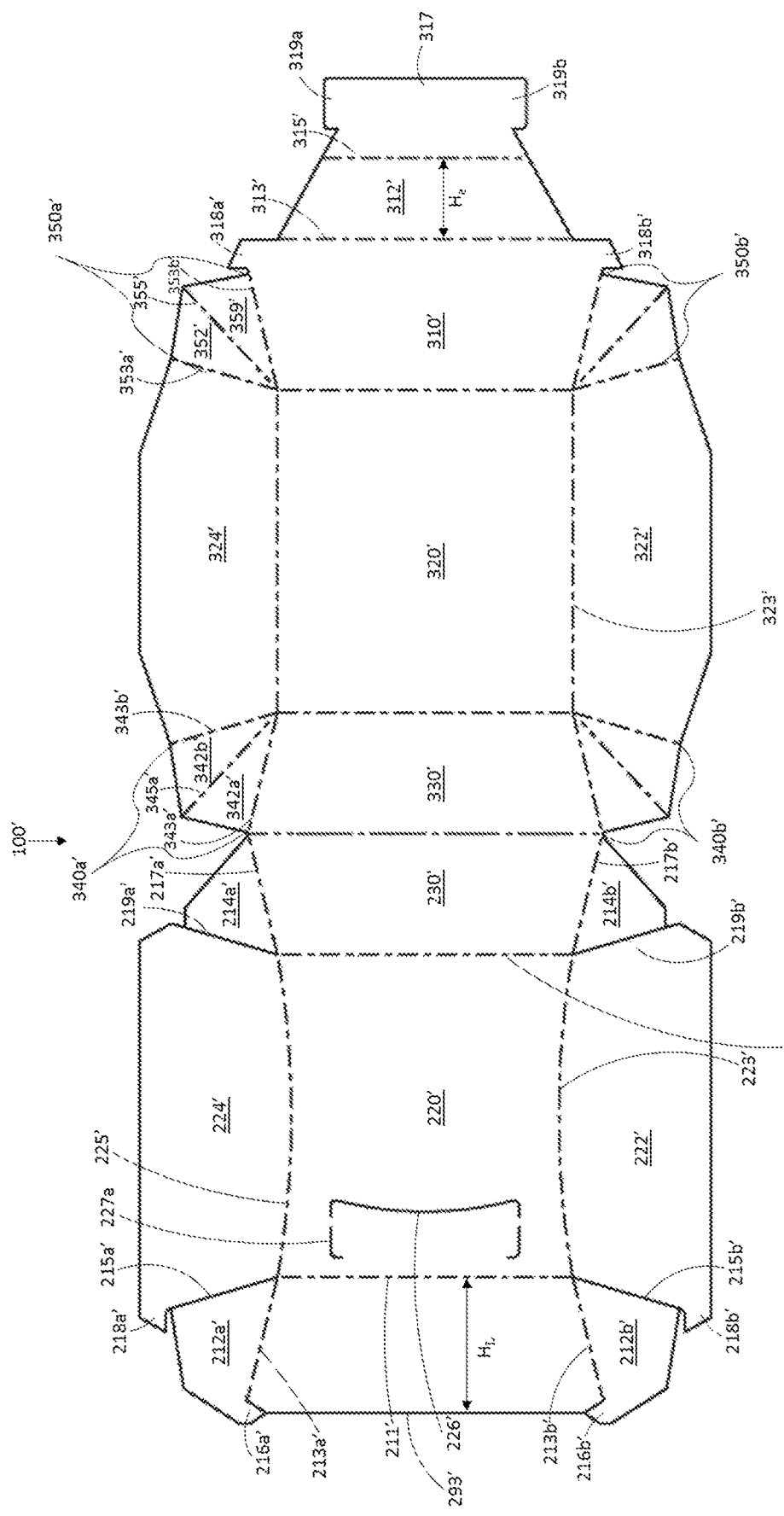
FIG. 3 is a plan view of an exemplary blank configured to form a clamshell container with a lid and a tray, where the tray has a square-shaped bottom panel and the lid has a square-shaped top panel.

As shown in FIG. 3, various fold lines, e.g., 223' and 225', can be curved. Alternatively, as shown in FIG. 1, the same fold lines, e.g. 223 and 225, can be straight. Although the curved fold lines are shown on the lid portion 200', similar curved fold lines can also be present on the tray portion 300'. Whether a given fold line is curved or straight depends on the desired geometry of the resulting container.

c. Locking Mechanism: Belt Formed from Extension Portion with Tab

The front tray panel typically includes an extension portion, which is connected to the front panel along a fold line. The extension portion extends beyond the height of the side tray panels, when the tray is assembled. The extension portion terminates with a tab of any suitable shape, such as a hook tab or tuck tab. The extension portion is foldable along the fold line such that it lies in a different plane than the plane of the front tray panel. When folded, the extension portion typically lies in a first plane that is parallel to the plane of the front lid panel, while the tab lies in a plane that is substantially parallel to the top panel of the lid. These planes intersect at an angle greater than 90°.

The extension portion may include a second fold line, which aligns with the edge formed by the fold line between the front lid panel and the top lid panel when the tray is assembled. The second fold line allows the tab to be folded such that it is substantially parallel to the top lid panel and inserts in a slit on the top lid panel to secure the container in the closed and locked position. The extension portion may include two or more alignment fold lines (such as 2, 3, 4, 5, or more alignment fold lines) adjacent to each other to allow for variability in the shape of the container when it is filled with its contents. Having at least two alignment fold lines allows for a container to be filled such that its lid bulges, yet the container can be secured in the closed and locked position by inserting the tab attached to the extension portion into the slit on the lid. Optionally, the extension portion includes two perforated lines (1011''' and 1013''' in FIG. 2B and lines 1011'''' and 1013'''' in FIG. 2C) that form a zipper (see, e.g., FIG. 2B, zipper 1010''' and FIG. 2C, zipper 1010'''') and/or a single perforated line (not shown in figures). Optionally, the zipper includes a pull-tab on one end or both ends of the zipper. For example, the zipper includes a single pull-tab on one end of the zipper. Alternatively, the zipper includes two pull-tabs, where a first pull-tab is on a first end and a second pull-tab is on a second end of the zipper (see, e.g., FIG. 2B, 1012''' and 1014''').

In some embodiments, the extension portion includes a pair of tabs on the corners of the extension portion, generally located at the bottom of the extension portion. The length between the pair of tabs is longer than the fold line connecting the extension portion and the front tray panel. In the closed position, the extension portion and its pair of tabs lies on top of a portion of the front lid panel. The length between the pair of tabs is shorter than the fold line between the front lid panel and the top lid panel. The pair of tabs can serve as tray detents, which provide an additional locking mechanism for the container in its closed position.

The front lid panel may include a corresponding pair of tabs in the recessed portion of the front lid panel. The pair of tabs on the front lid panel can serve as lid detents that mate with the tray detents located on the extension portion of the front tray panel. In some embodiments, the lid detents and tray detents are configured to contact each other when the container is in the closed position, such that the inside surface of the lid detents contacts the outside surface of the front tray panel and the lid detents lie on top of a portion of the outside surface of the front tray panel and above the lid detents.

EXAMPLES

A. Clamshell Containers with Rectangular Bottom and Top Panels

FIG. 1 illustrates a plan view of a blank 100 that may be used to form an exemplary clamshell carton with a rectangular tray and lid, such as illustrated in FIGS. 5A-5C. The blank 100 may include a first surface 110 and a second surface on an opposing side of the blank. The first surface 110 may define an outer surface when the blank is formed into a clamshell carton, and the second surface may define an inside surface.

The blank 100 may comprise a number of panels interconnected by fold lines or other suitable lines of weakening. Generally, the blank 100 may include a lid portion 200 and a tray portion 300 which may be connected by a fold line 112. The lid portion 200 and the tray portion 300 may be assembled to respectively form a lid 2000 and a tray 3000.

Optionally, the fold line 112 connecting the lid portion and tray portion is broken or open in one or more locations, such as in the form or a slit or perforations, which helps prevent buckling of the container when it is formed.

The lid portion 200 contains a top panel 220 in the center of the lid portion, and the top panel is foldably connected to four lid panels, with one on each side of the top panel. The four lid panels are the front lid panel 210, the two side lid panels 222, 224 and the rear lid panel 230.

More specifically, the lid portion 200 contains a front lid panel 210 foldably connected along fold line 211 to a top panel 220. The top panel 220 is foldably connected along fold line 221 to rear lid panel 230. Side lid panels 222, 224 are respectively foldably connected to the top panel 220 along respective fold lines 223, 225. Optionally, the rear lid panel is modified to include a perforated line and/or a zipper, such as the zipper on the rear lid panel as shown in FIG. 32C, zipper 2010'.

The top panel 220 also contains a slit 226 configured to receive a corresponding tab that extends from the tray portion 300.

The tray portion 300 contains a bottom panel 320 in the center of the tray portion, and the bottom panel is foldably connected to four tray panels, with one on each side of the bottom panel. The four tray panels are the front tray panel 310, the two side tray panels 322, 324 and the rear tray panel 330.

The tray portion 300 includes a rear tray panel 330 that is foldably connected to the rear lid panel 230 along fold line 112. The rear tray panel 330 is foldably connected along fold line 321 to a bottom panel 320. The bottom panel 320 is foldably connected along fold line 311 to a front tray panel 310. Further, side tray panels 322, 324 are respectively foldably connected to the bottom panel 320 along respective fold lines 323, 325.

The front tray panel may include an extension portion 312, which extends beyond the height of the side tray panels, when the tray is assembled. The extension portion 312 is foldably connected to the front panel along a fold line 313. The extension portion includes a second fold line 315 (also referred to as an alignment fold line), which aligns with fold line 211 on the lid, when the container is in the closed position. Optionally, the extension portion contains two or more alignment fold lines, 315a, 315b, that are adjacent to each other to allow for variability in the shape of the container when it is filled with its contents. Having at least two alignment fold lines allows for a container to be filled such that its lid bulges, yet the container can be secured in the closed position, by inserting the tab on the extension portion into a slit on the lid. The extension portion 312 terminates in a tab of any suitable shape, such as a hook tab 314 (see FIG. 1) or tuck tabs 319a and 319b (see FIG. 3), which fit in the slit 226 on the top panel of the lid to secure the container in the closed position. Optionally, the extension portion of the front tray panel includes a perforated line or a zipper, such as zipper 1010' shown in FIG. 31B, to facilitate opening a closed and locked container.

In the tray portion, gussets 340a and 340b attach the rear tray panel 330 to the respective adjacent side panel 324, 322. Gussets 350a and 350b attach the front tray panel 310 to the respective adjacent side panel 324, 322. Gussets 340a, 340b, 350a, and 350b are typically secured to the outside surface of the respective side panel 322, 324. Optionally, gussets 340a", 340b" can be secured to the outside surface of the rear tray panel 330 (see, e.g. FIG. 6C). Alternatively, gussets 340a, 340b can be folded inwardly and secured to the inside surface of the side panels 322, 324 or the rear tray panel 330 (not shown in Figures).

Optionally, gussets 350a and 350b are formed from a gusset panel 352 that includes a tab portion 316 that aligns with a correspondingly shaped tab portion 318 on the front tray panel 310 and forms a pair of tray detents 360a", 360b", i.e. a portion of a locking mechanism (see FIGS. 6A-6C). In this embodiment, the tray detents are two-ply or bi-layered. Alternatively, either the gusset panel 352 or the front tray panel 310 does not include a tab portion 316 or 318, respectively. In this embodiment, the tray detents 360a, 360b, i.e. a portion of a locking mechanism, are single layer or single-ply (see e.g., FIGS. 5A-5C).

Each gusset 340a, 340b, 350a, and 350b in the tray is formed from overlapping gusset panels 342a and 342b connected by a fold line 345 that is substantially in the center between the two gusset panels. Fold line 345 is an oblique line and intersects with side fold lines 343a and 343b. Side fold lines 343a and 343b connect the respective gusset panels to the adjacent side panel with sealing portions of the gusset panels extending the full depth of the side panels.

Figure 8A:
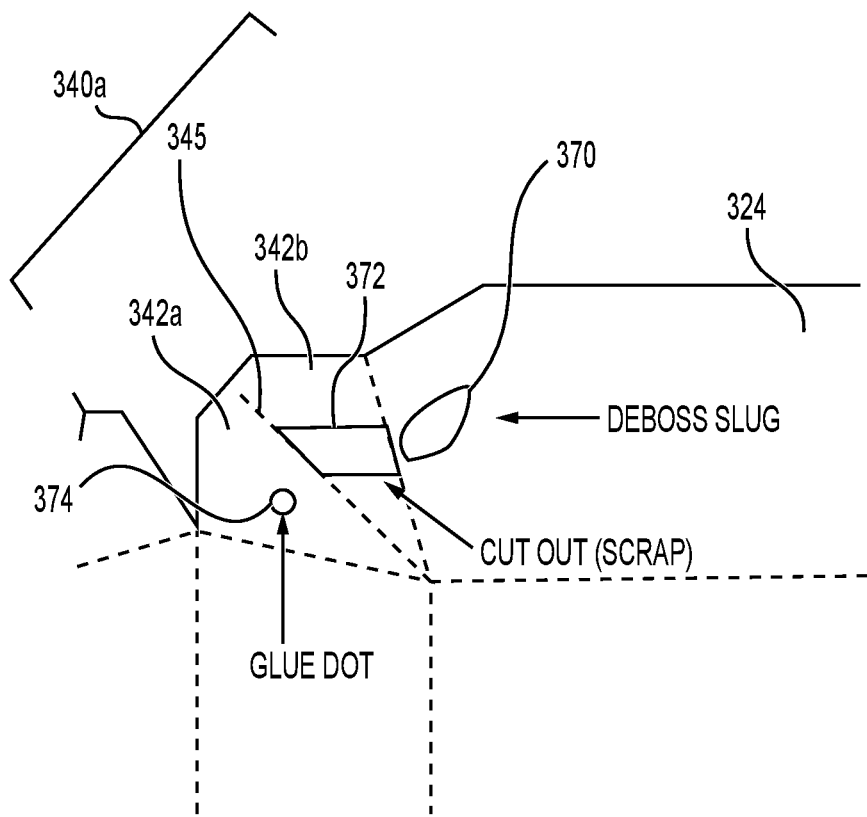
FIGS. 8A and 8B are partial plan views of blanks with two variations for the corners that form gussets on the tray portion of the clamshell container.
Figure 8B:
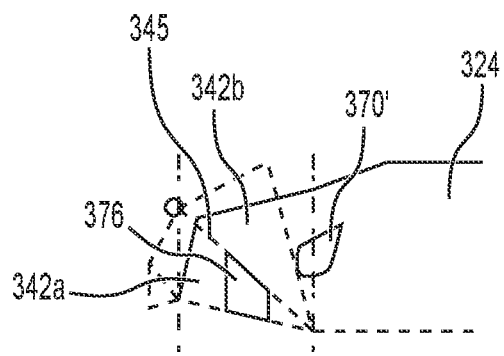

Optionally, the paperboard blank contains one gusset panel with a cut-out portion 372, 376 in one or more of the pairs of gusset panels (e.g., one panel in the pair containing gusset panels 342a, 342b and one panel in the pair containing gusset panels 352, 354). The cut-out portion 372, 376 is located in the gusset panel that is closest to the panel to which it is being attached. By including a cut-out, adhesive is also placed on a portion, typically the upper portion of the outer gusset, thereby directly sealing the outer gusset to the side panel as well. Optionally, the portion of the side panel (or, alternatively, rear or front panel) to which the gusset is adhering contains a debossed or embossed raised portion 370, 370' that has a corresponding shape to fit inside the cut-out portion 372, 376, and thereby facilitate a secure attachment of the gusset to the adjacent tray panel (see, e.g. FIGS. 8A and 8B).

In the lid portion, a glue tab 212a (e.g., a flap for being attached, such as with adhesive material) may be connected to the front lid panel 210 along fold line 213a. The glue tab 212a may abut, but remain separate from (e.g., disconnected from), the adjacent side lid panel 210 due to a cut line 217 being positioned therebetween. Similarly, glue tab 214a is connected along fold line 217a to rear lid panel 230. Also similarly, glue tab 214a may abut, but remain separate from the adjacent side lid panel 224 along cut line 219a. A mirror image of this glue tab configuration may be formed along the opposite side of the blank 100 where glue tabs 212b and 214b (e.g., attachment flaps) are connected along fold lines 213b and 217b, respectively, to front lid panel 210 and rear lid panel 230, respectively. Similarly, glue tabs 212b and 214b extend until but are separate from the adjacent side lid panel 222 along respective cut lines 215b and 219b.

The pair of glue tabs 212a and 212b, which are attached to the front lid panel 210, optionally contain a tab portion 216a and 216b. The tab portion 216a and 216b can align with a correspondingly shaped tab portion 218a and 218b on the adjacent side panel 222, 224 to form a pair of bi-layer or double-ply lid detents 260a, 260b, which mate with the corresponding tray detents 360a, 360b (or 360a", 360b") to serve as a locking mechanism when the container is in the closed position.

In some embodiments, neither the side lid panels nor the front lid panel contain a tab portion. In these embodiments, the lid does not include detents to interlock with corresponding detents on the tray. Optionally, either the side lid panels or the front lid panel do not contain tab portions. In this embodiment, if lid detents are present, the lid detents are single layer or single-ply.

Similarly, glue tab 214a is connected along fold line 217a to rear lid panel 230. Also similarly, glue tab 214a may abut, but remain separate from the adjacent side lid panel 224 along cut line 219a. A mirror image of this glue tab configuration may be formed along the opposite side of the blank 100 where glue tabs 212b and 214b (e.g., attachment flaps) are connected along fold lines 213b and 217b, respectively, to front lid panel 210 and rear lid panel 230, respectively. Similarly, glue tabs 212b and 214b extend until but are separate from the adjacent side lid panel 222 along respective cut lines 215b and 219b.

The glue tabs are configured to attach the front lid panel and rear lid panel to each of the side lid panels to form the lid. In one embodiment, the side lid panels 222, 224, front lid panel 210, and rear lid panel 230 of the lid portion 200 are folded toward one another, the glue tabs 212a, 212b, 214a, 214b fold inwardly to overlie partially the inner surfaces of their respective adjacent side panels, 222 and 224, to which they can be attached via an adhesive (or other material or method) to form the lid 2000. Alternatively, the glue tabs may be adhesively or otherwise attached to the exterior surfaces of the respective side panels.

FIG. 15 illustrates a plan view of a blank 100" that may be used to form another exemplary clamshell carton with a rectangular tray and lid, such as illustrated in FIGS. 17A-17C and 18A-18C. The reference numbers and corresponding descriptions above with respect to the exemplary blank for forming a rectangular clamshell container in FIG. 1 generally apply to the blank illustrated in FIG. 15 and the resulting clamshell container. However, the blank depicted in FIG. 1 includes interlocking detents that align substantially perpendicular to each other to lock the resulting container in closed position, while the blank depicted in FIG. 15 contains interlocking detents that align nearly parallel, yet intersecting planes at less than 90°, and typically between 0° and 10°, between 0° and 5° or less than 5°, such that one set of detents lies on top of the other to lock the resulting container in the closed position. Differences between blank 100" in FIG. 15 with respect to blank 100 in FIG. 1 and the resulting clamshell containers are described below.

FIG. 15 shows a different configuration than shown in FIG. 1 for the locking mechanism that utilizes interlocking lid detents and tray detents.

As shown in FIG. 15, the extension portion 312" includes a pair of tabs 382a and 382b on the opposite corners of the extension portion, generally located at the bottom of the extension portion 312" near the fold line 313", which connects the front tray panel 310" to the extension portion 312". The tabs function as a pair of tray detents and protrude beyond the fold line 313". The distance ($d_1$) between the tabs 382a and 382b is longer than the length ($L_1$) of the fold line 313". When the container is assembled and placed in the locked position, the pair of tabs 382a and 382b function as tray detents that lie on top of the front lid panel 210" and in a plane that is nearly parallel to, but intersects with, the plane of the front lid panel 210".

The front lid panel 210" includes a corresponding pair of tabs 282a and 282b inwardly protruding along a portion of the upper border 281 of the front lid panel 210".

As shown in FIG. 15, the front lid panel 210''' includes a recessed portion 285, defined by an upper border 281, two side borders 287a and 287b, and a first and a second portion of a lower border 293"a and 293"b. The height of the front lid panel ($H_L$) is measured from the upper border 281' of the recessed portion to the fold line 211" between the front lid panel 210" and the top panel 220".

The pair of tabs 282a and 282b on the front lid panel 210" are configured to function as lid detents when the container is assembled and in the locked position, such that the lid detents 282a and 282b interlock and mate with the tray detents 382a and 382b when the container is in the closed position. The lid detents 282a and 282b and tray detents 382a and 382b are configured to contact each other when the container is in the closed position, such that the inside surface of the lid detents contacts the outside surface of the front tray panel and the lid detents lie on the outer position along the front tray panel (see FIGS. 17B-17C).

Although not illustrated in FIG. 15, the tab 314" and corresponding slit 226" can be modified to have any other suitable configuration, such as illustrated in FIGS. 23A-24D and 24A-24C, 24D, and 24E.

The lid and/or tray optionally include one or more vents, one or more zippers, and/or a perforated line. For example, the blank 100" shown in FIG. 15 can be modified to include a zipper on the extension portion of the front tray panel, in the connecting region of the front tray panel, and/or on the rear lid panel, such as the zipper as shown in FIG. 31B, zipper 1010' and FIG. 31C, zipper 2010'. The vents can be formed from a single cut line or more than one cut line on one or more panels.

Figure 16:
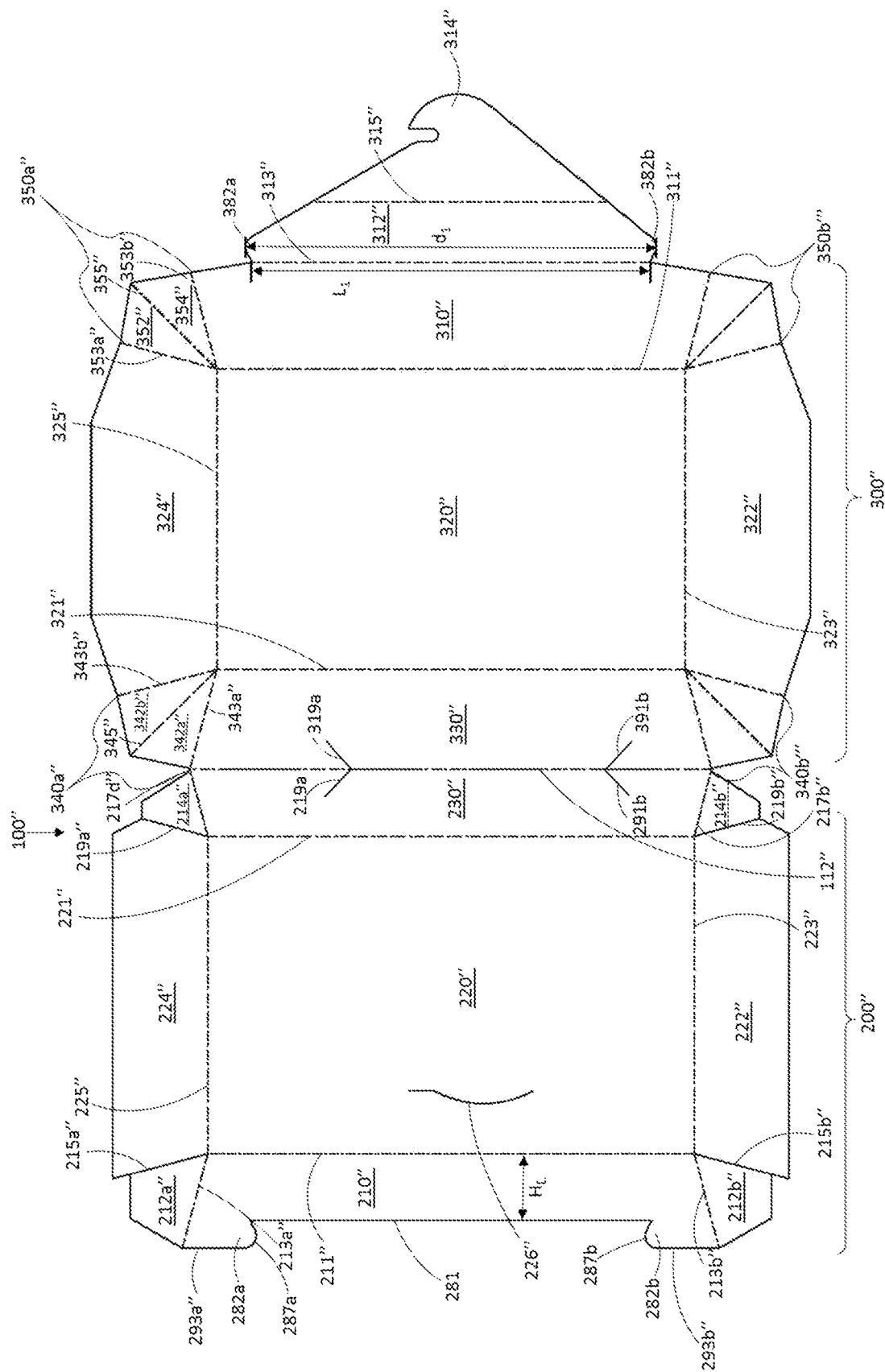
FIG. 16 is a plan view of an exemplary blank configured to form a clamshell container with a lid and a tray, where the tray has a rectangular bottom panel and corresponding tray detents, the lid has a rectangular top panel and corresponding lid detents, and the fold line connecting the lid portion and tray portion has two pairs of relief cuts.
Figure 17:
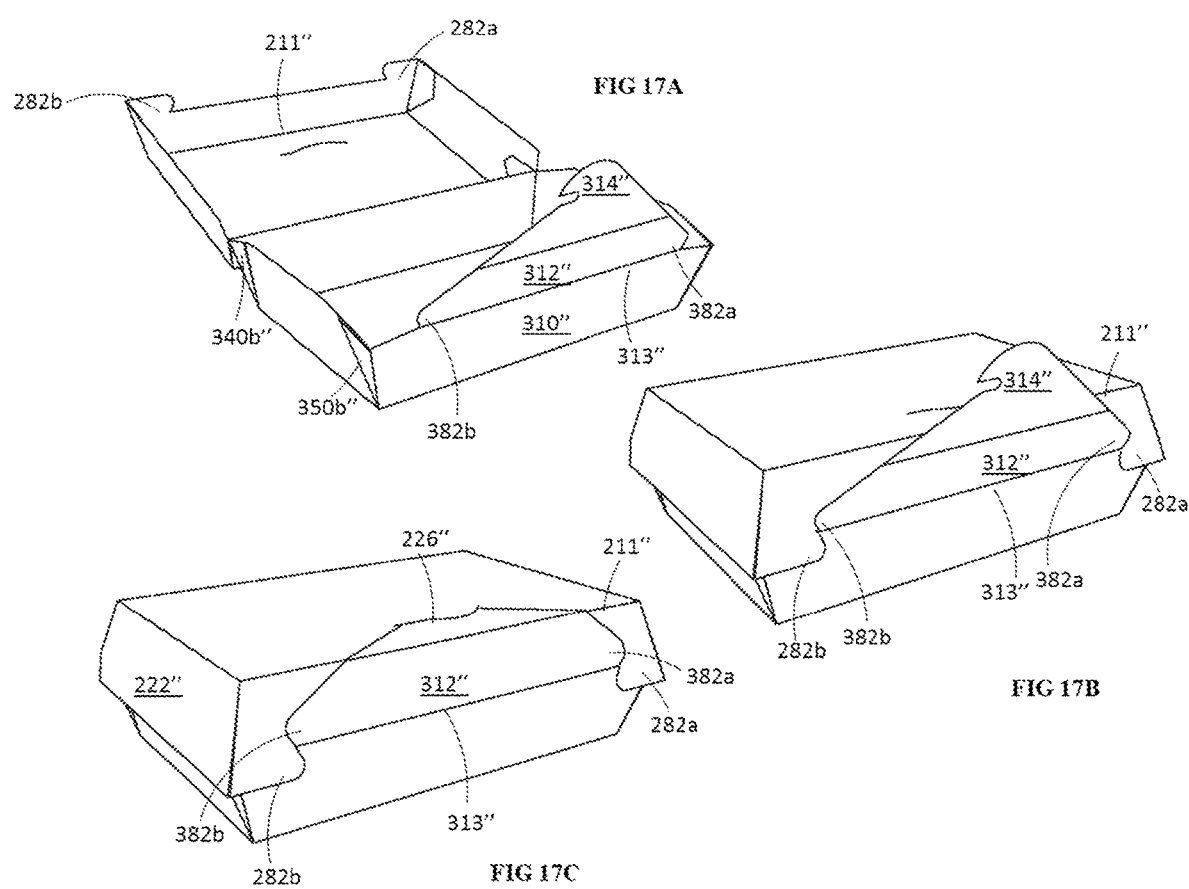
FIG. 17A-17C are perspective views of the clamshell container that forms when the blank depicted in FIG. 15 is assembled.

The vents can be formed from relief cuts on the fold line of the container to allow for heat and steam to escape from the closed container, such as when hot food is enclosed therein. As shown in FIG. 16, two pairs of relief cuts 291a and 391a, 291b and 391b may be included on the blank 100". Relief cuts 291a, 291b are located on the rear lid panel 230" and relief cuts 391a, 391b are located on the rear tray panel 330". Each pair of relief cuts, 291a and 391a, 291b and 391b, forms a V-shape centering on the fold line 112" that connects the lid portion 200" and the tray portion 300". Alternative configurations of relief cuts may also be present on the blank. For example, more than two pairs of relief cuts may be present, or the pairs of relief cuts may be aligned in a different manner, such as substantially parallel to each other.

As shown in FIGS. 9A, 9B, 23A, and 23B, the vents can be a single cut line 292 or 292' in the rear panel. Alternative configurations for the vents may also be present on the blank. For example, more than one vent may be present on the same panel or different panels.

Alternatively, blanks that may be used to form exemplary clamshell containers with a rectangular tray and lid can contain single locking mechanism involving a belt that extends from one portion of the clamshell container, such as the tray and wraps around part of the other portion, such as the lid, and is secured thereto, such as by inserting a tab into a slot configured to receive and retain the tab.

Figure 18:
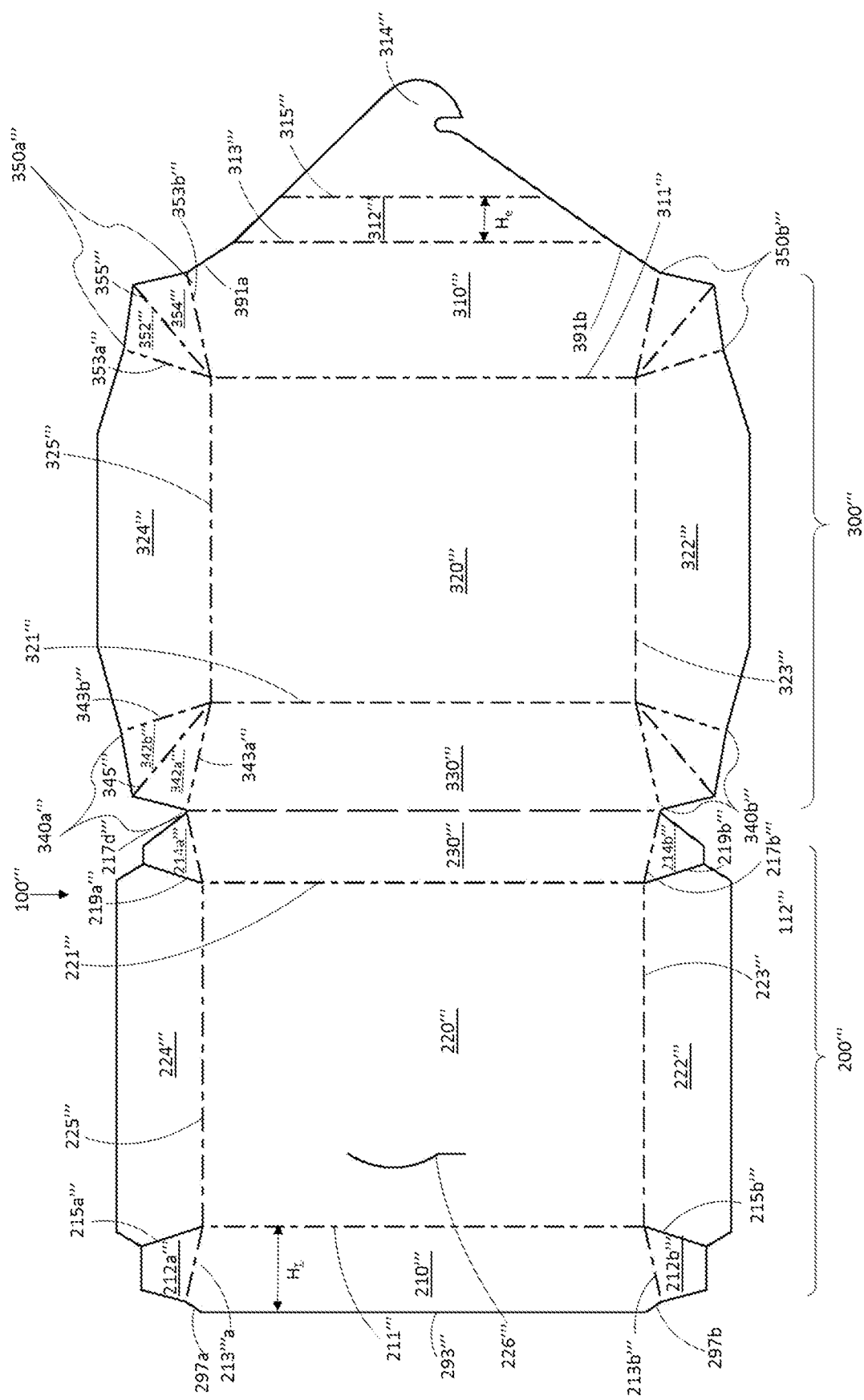
FIG. 18 is a plan view of an exemplary blank configured to form a clamshell container with a lid, a tray, and a locking mechanism, where the tray has a rectangular bottom panel, and the lid has a rectangular top panel. The locking mechanism contains a belt formed by an extension portion attached to the tray that terminates in a tab, which is insertable into a slit in the top panel of the lid when the container is assembled.
Figure 19:
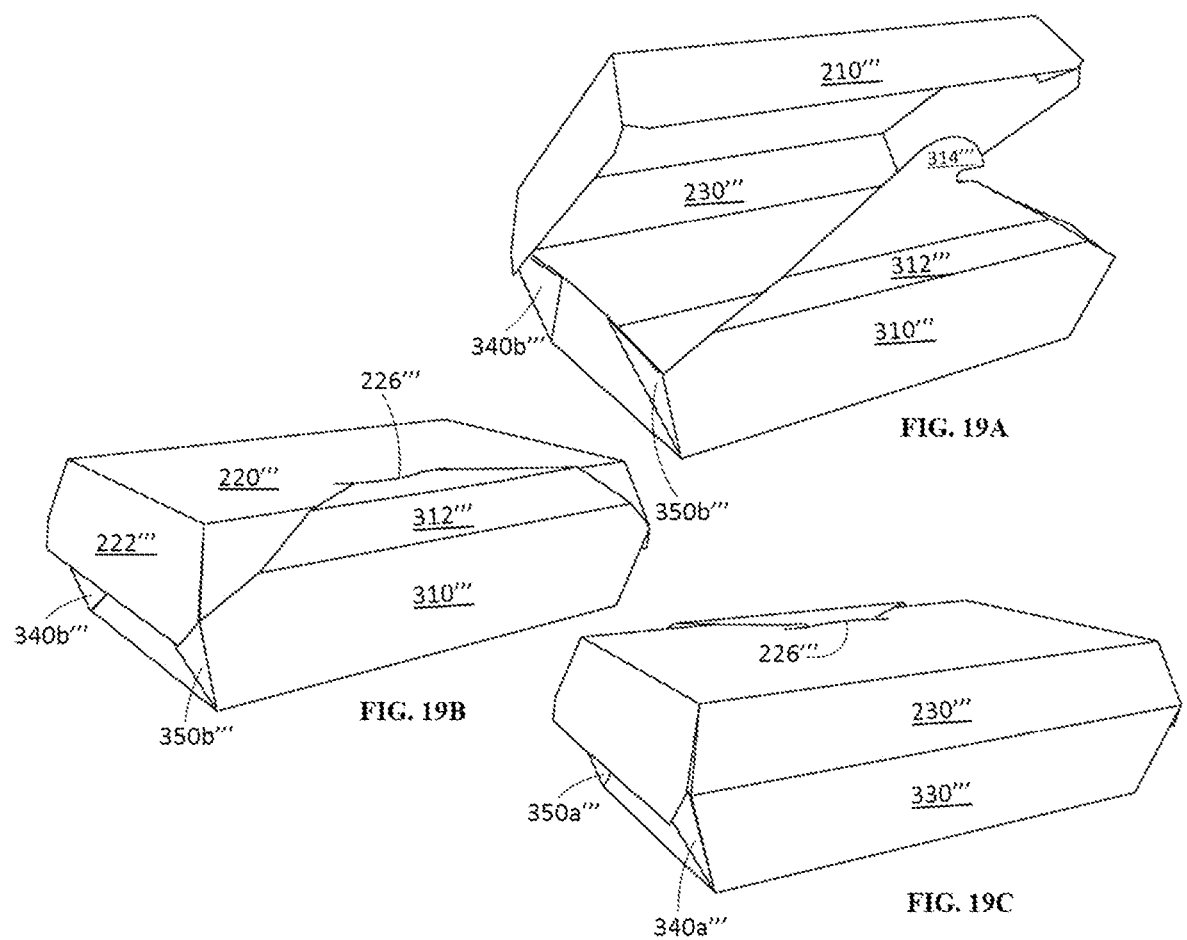
FIGS. 19A-19C are various views of the clamshell container that forms when the blank depicted in FIG. 18 is assembled.
Figure 28:
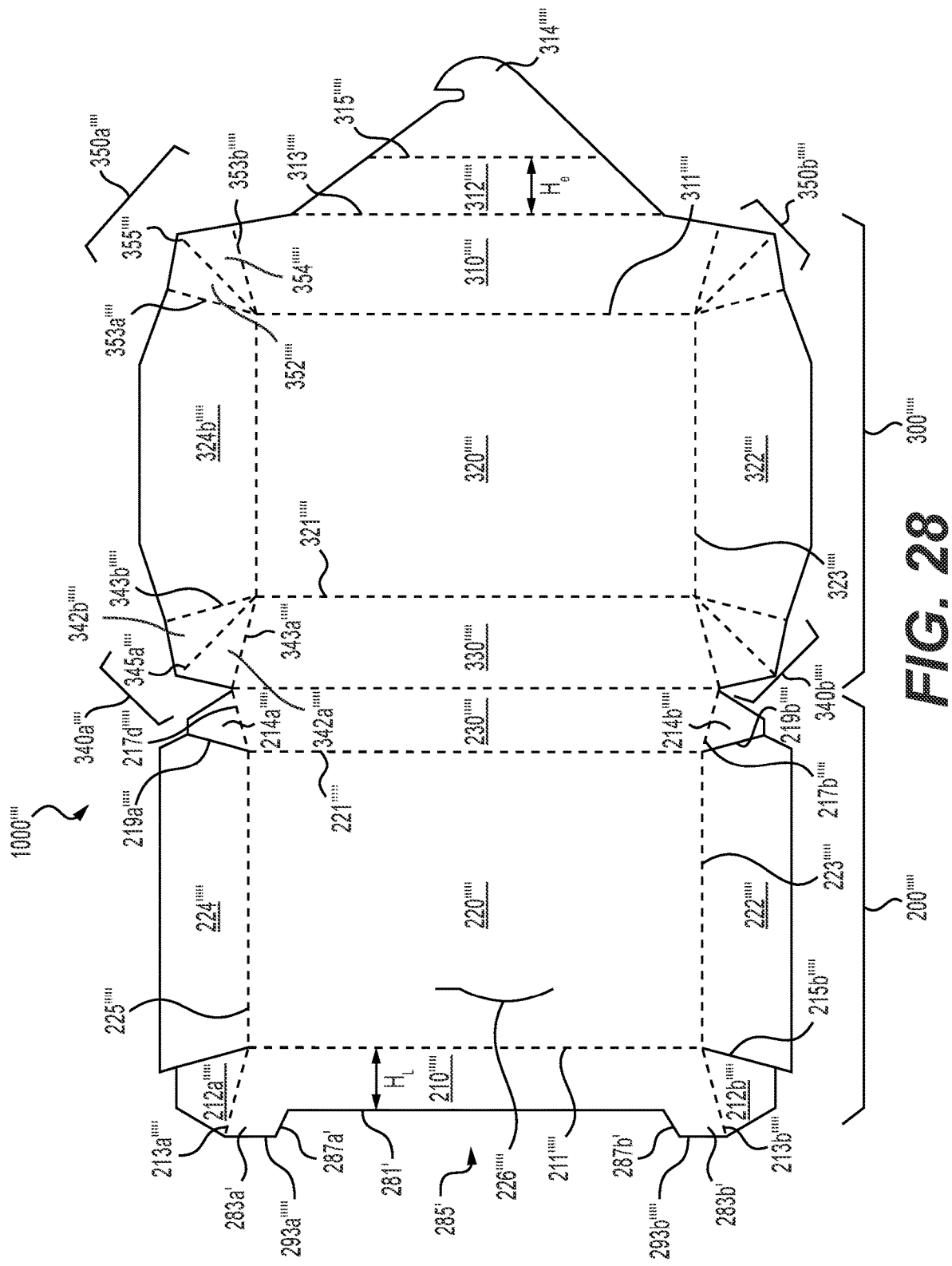
FIG. 28 is a plan view of an exemplary blank configured to form a clamshell container with a lid, a tray, and a locking mechanism, where the tray has a rectangular bottom panel, and the lid has a rectangular top panel and a recessed front panel. The locking mechanism contains a belt formed by an extension portion attached to the tray that terminates in a hook, which is insertable into a slit in the top panel of the lid when the container is assembled.

Exemplary blanks, such as 100''' and 100'''', that contain a single locking mechanism involving an extension portion are illustrated in FIGS. 18, 28, and 29. The reference numbers and corresponding descriptions above with respect to the exemplary rectangular clamshell containers in FIG. 1 and FIG. 15 generally apply to the blanks for forming the rectangular clamshell containers without detents in FIGS. 18, 28, and 29, respectively.

A few differences between blank 100 (FIG. 1) and blank 100''' (FIG. 18), and between blank 100" (FIG. 15) and 100'''' (FIG. 28) for forming rectangular clamshell containers are described below.

As shown in FIG. 18, the upper border of the front tray panel 310''' is defined by fold line 313''' and cut lines 391a and 391b, where each of cut lines 391a and 391b is located on an opposite end of fold line 313'''. The upper border of the front lid panel 210''' is defined by lower border cut line 293''' and with connecting cut lines 297a and 297b, which are located on opposite ends of lower border cut line 293''' and attached via fold lines to each of glue tabs 212a''' and 212b'''.

As shown in FIG. 18, the front lid panel 210''' does not contain a recessed portion. However, the blank in FIG. 18 could be modified to contain a recessed portion 285', such as illustrated in FIG. 28.

As shown in FIG. 28, the front lid panel 210'''' includes a recessed portion 285', defined by an upper border 281', two side borders 287'a and 287'b, and a first and a second portion of a lower border 293''''a and 293''''b. The height of the front lid panel ($H_L$) can be measured from the upper border 281' of the recessed portion 285' to the fold line 211'''' between the front lid panel 210'''' and the top panel 220''''.

Although not illustrated in FIGS. 18 and 28, the blank 100''' and blank 100'''' can be modified to include a perforated line and/or a zipper on the tray panel and/or lid panel of the blank (e.g., on the extension portion of the front tray panel, in the connecting region of the front tray panel, and/or on the rear lid panel), such as the zipper as shown in FIG. 31B (see, e.g. zipper 1010') and/or in FIG. 31C (see, e.g. zipper 2010').

Although not illustrated in FIGS. 1, 15, 18, and 28, the extension portion and hook, and the corresponding slit on the top lid panel may be replaced by any shape and configuration. Exemplary alternative shapes for the tab, extension portion, and slit are shown in FIGS. 9A-9F and 29.

B. Clamshell Containers with Square Bottom and Top Panels

FIG. 3 illustrates a plan view of a blank 100' which may be used to form an exemplary clamshell carton with a square tray and lid, such as illustrated in FIGS. 4A-4C. The blank 100' may include a first surface 110' and a second surface on an opposing side of the blank. The first surface 110' may define an outer surface when the blank is formed into a clamshell carton, and the second surface may define an inside surface.

The reference numbers and corresponding descriptions above with respect to the exemplary rectangular clamshell container generally apply to the blank for forming a square-shaped clamshell container and the resulting clamshell container. However, the proportions and angles are different. Thus the same reference numbers are used in FIG. 3, however, they are denoted with a prime symbol, e.g. side lid panels 224' and 222'.

A few differences between the blank for forming the rectangular clamshell and the blank for forming the square-shaped clamshell are described below.

FIG. 3 shows a different configuration than shown in FIG. 1 for the locking mechanism that utilizes a slit on the top panel. Although not illustrated in FIG. 3, the locking mechanism for the square-shaped clam shell can have the same configuration as illustrated in FIG. 1, i.e. slit 226 and hook 314 at the end of the extension portion 312. As shown in FIG. 3, the locking mechanism includes two tabs 319a and 319b attached to each other via a connecting portion 317. The connecting portion can have any suitable geometry to attach the tabs to each other, such as curved or straight. As shown in FIG. 3, the connecting portion 317 can be substantially straight. The top panel 220' contains a slit 226' configured to receive corresponding tabs 319a and 319b that extend from the extension portion 312' of the front panel 310' of the tray 300'. The slit 226' can be a single cut line having a suitable shape and size to receive the tabs 319a and 319b. Optionally, one or more additional cut lines 227a and 227b are arranged perpendicularly to the slit, such as located on each side of the slit and configured to facilitate removal of the tabs from the slit.

Additionally, as shown in FIG. 3, the tab portions 216a' and 216b' protrude from each of the respective side panels 224' and 222' and are not in contact with the adjacent glue tab 212a' and 212b'. The lid assembles as described above with respect to the rectangular container, with the glue tabs 212a' and 212b' connecting to the adjacent side panel 224' and 222', respectively, and each of the tab portions 216a' and 216b' of the glue tabs aligning with a correspondingly shaped tab portion 218a' and 218b' on the adjacent side panel 222', 224' to form bi-layer or double-ply lid detents 260a', 260b. When the container is in the closed position, the lid detents 260a', 260b' are located below the corresponding tray detents 360a', 360b'. The tray detents 360a', 360b' secure the lid detents 260a', 260b' in place, thereby serving as a locking mechanism, which prevents the lid from opening without the use of force to push the detents out of the locked position.

As shown in FIG. 3, various fold lines, e.g., 223' and 225', can the curved. For example, in FIG. 3, each of the fold lines between the side lid panels 222', 224' (e.g., the side lid panels) and the top panel 220' curve inwardly toward the top panel 220'. As shown in FIGS. 4A and 4B, when the lid is assembled the side lid panels 224' and 222' curve inwardly, i.e. are concave.

Alternatively, as shown in FIG. 1, the same fold lines, e.g. 223 and 225, can be straight. Whether a given fold line is curved or straight depends on the desired geometry of the resulting container. When the blank includes straight fold lines, such as 223 and 225, the resulting container has substantially flat side lid panels, 224" and 222" as depicted in FIGS. 7A and 7B (222" is not visible in these figures).

Alternatively, blanks that may be used to form exemplary clamshell containers with a square tray and lid can contain single locking mechanism involving a belt that extends from one portion of the clamshell container, such as the tray and wraps around part of the other portion, such as the lid, and is secured thereto, such as by inserting a tab into a slot configured to receive and retain the tab.

Figure 20:
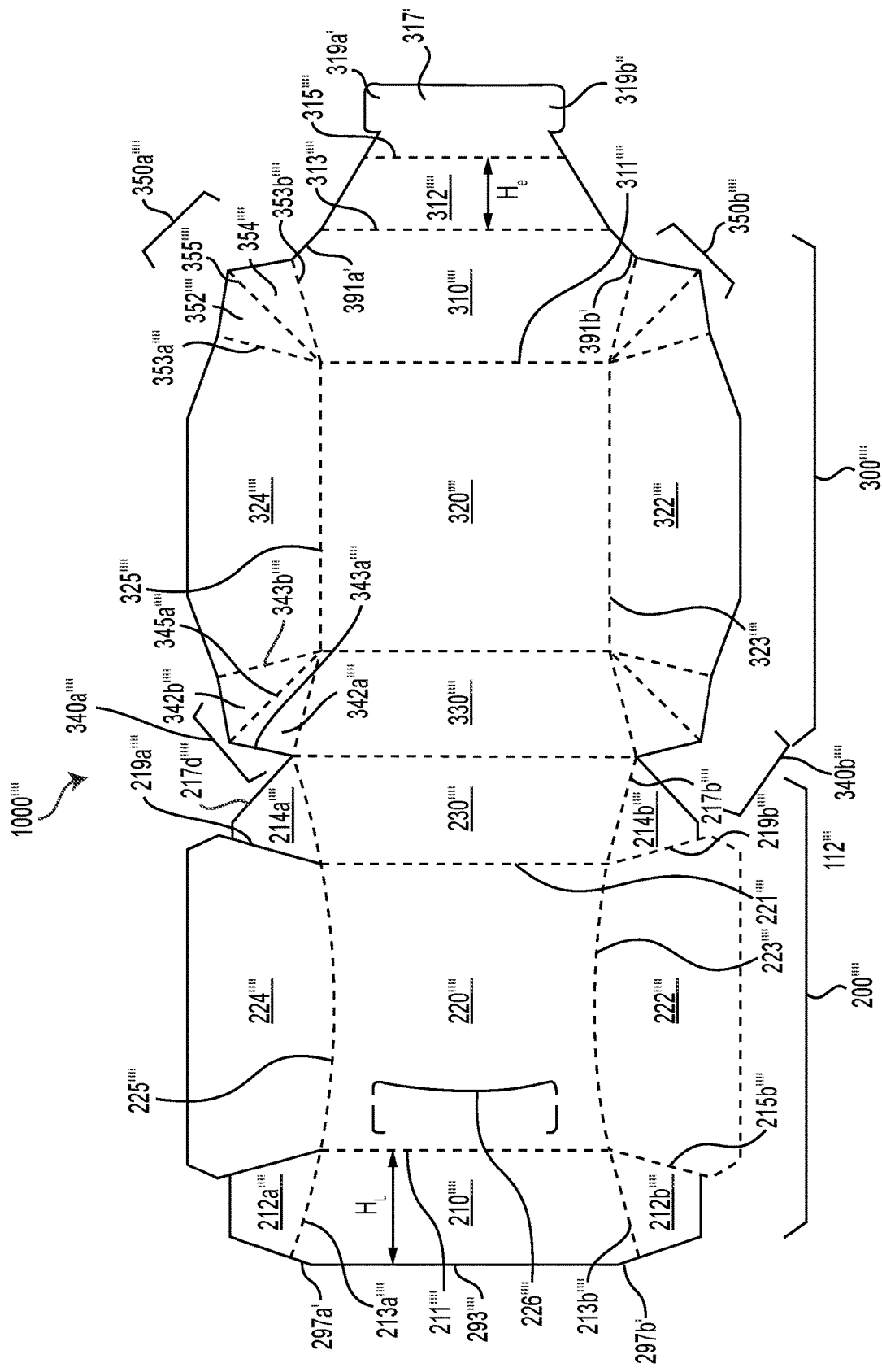
FIG. 20 is a plan view of an exemplary blank configured to form a clamshell container with a lid, a tray, and a locking mechanism, where the tray has a square-shaped bottom panel and the lid has a square-shaped top panel. The locking mechanism contains a belt formed by an extension portion attached to the tray that terminates in a tab, which is insertable into a slit in the top panel of the lid when the container is assembled.

An exemplary blank, such as 100"", that contains a single locking mechanism involving an extension portion is illustrated in FIG. 20. The reference numbers and corresponding descriptions above with respect to the exemplary rectangular clamshell container in FIG. 3 generally apply to the blanks for forming the rectangular clamshell containers without detents, such as illustrated in FIG. 20.

A few differences between blank 100' (FIG. 3) and blank 100"" (FIG. 20) for forming square clamshell containers are described below.

As shown in FIG. 20, the upper border of the front tray panel 310"" is defined by fold line 313"" and cut lines 391a' and 391b', where each of the cut lines 391a' and 391b' is located on an opposite end of fold line 313"". The border of the front lid panel 210"" is defined by lower border 293''' and connecting cut lines 297a' and 297b', which are located on opposite ends of the lower border 293''' and attached via fold lines 213b"" and 213a''' to each of the glue tabs 212a"" and 212b"".

Figure 2A:
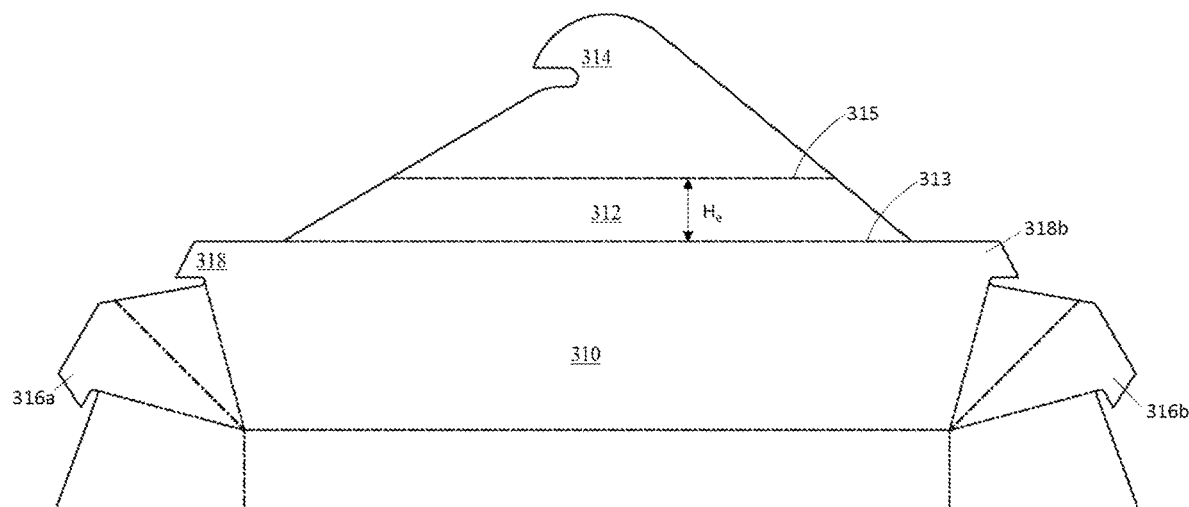
FIG. 2A is a partial plan views of an alternative configuration for front corners on the front tray panel of the blank depicted in FIG. 1, where the resulting gusset has a double layer tray detent.
Figure 2B:
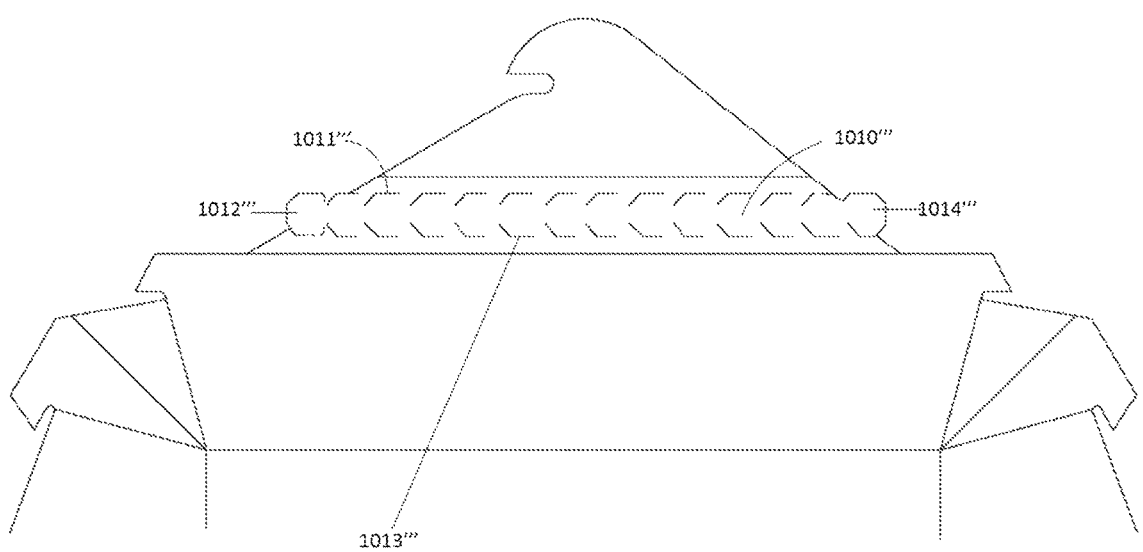
FIG. 2B depicts a modification of the partial plan view of the front tray panel of FIG. 2A, where the modification is a zipper with pull-tabs at each end in the extension portion.
Figure 2C:
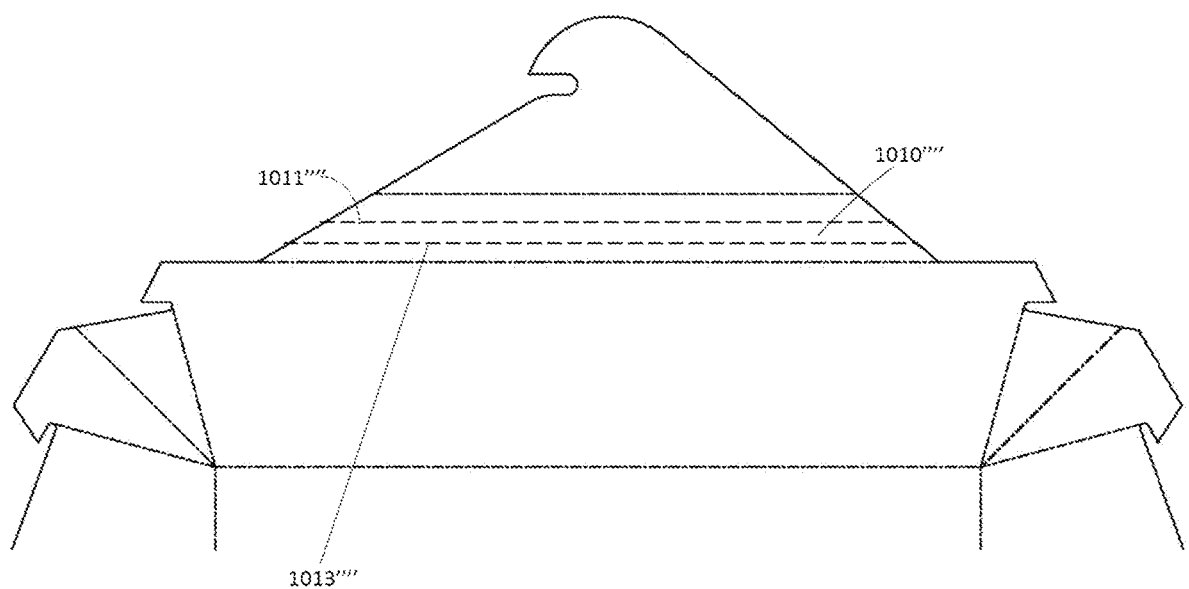
FIG. 2C depicts a modification of the partial plan view of the front tray panel of FIG. 2A, where the modification is a zipper in the extension portion.

Although not illustrated in FIGS. 3 and 20, blank 100' and blank 100"" can be modified to include a perforated line and/or a zipper on the extension portion of the front tray panel, in the connecting region of the front tray panel, and/or on the rear lid panel, such as the zipper as shown in FIG. 2B or 2C, zipper 1010''' or 1010"".

Figures 21A, 21B, 21C:
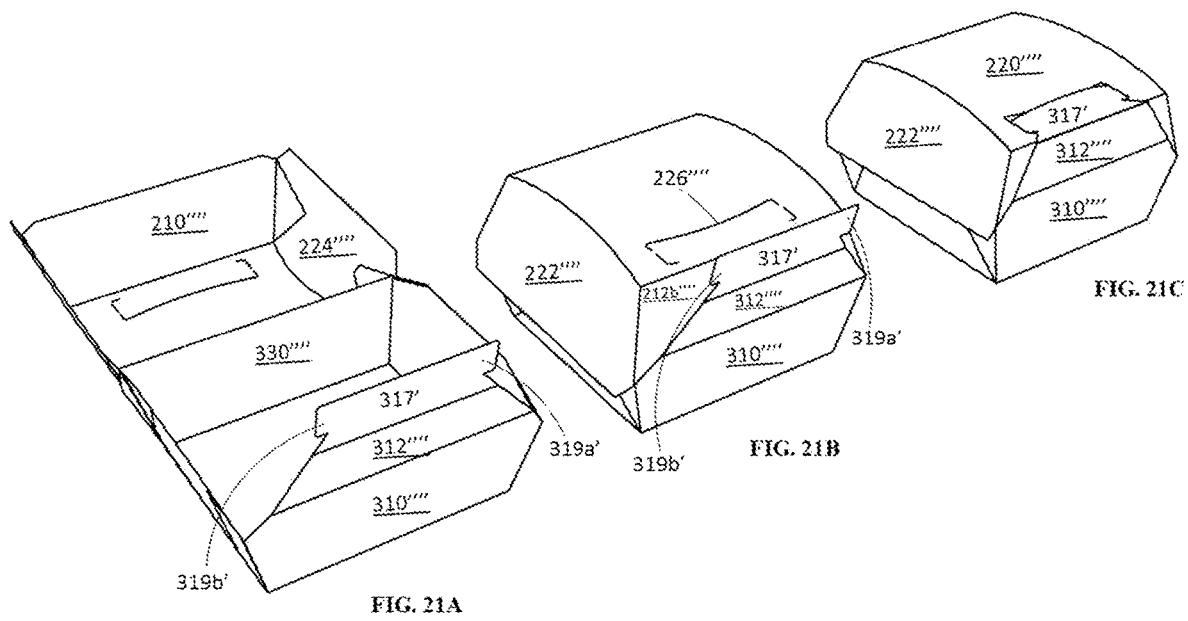
FIGS. 21A-21C are perspective views of a container assembled from the blank depicted in FIG. 20 in the open (FIG. 21A) and closed positions (FIGS. 21B and 21C).
Figure 23A:
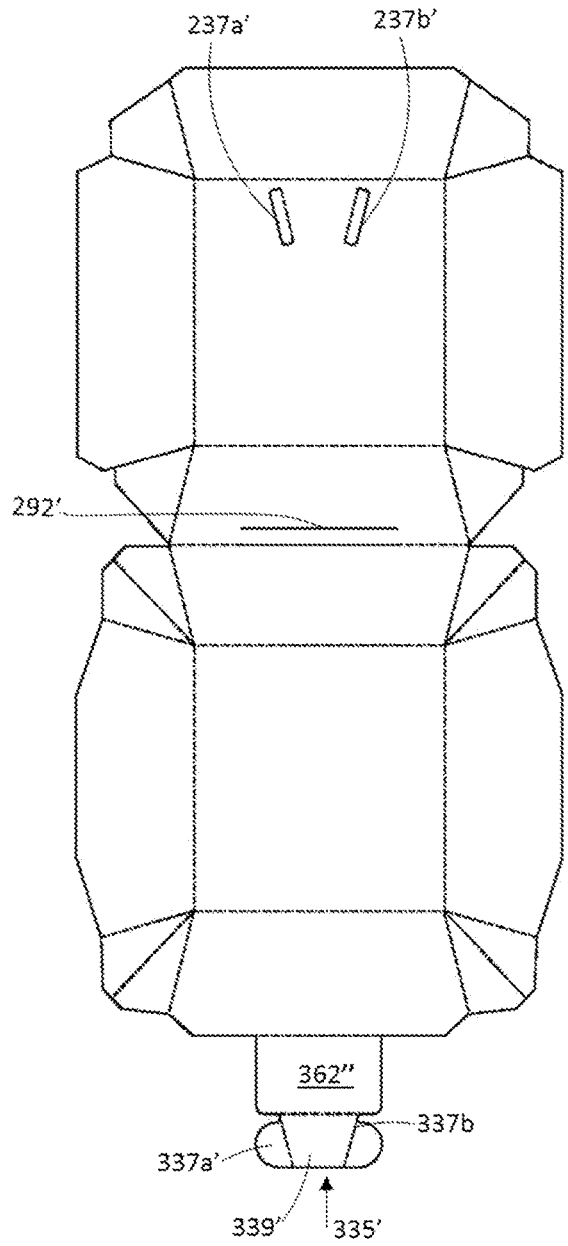
FIGS. 23A-23D show exemplary blanks for forming a square clamshell container with different tab and slit shapes for the locking mechanism.
Figure 23B:
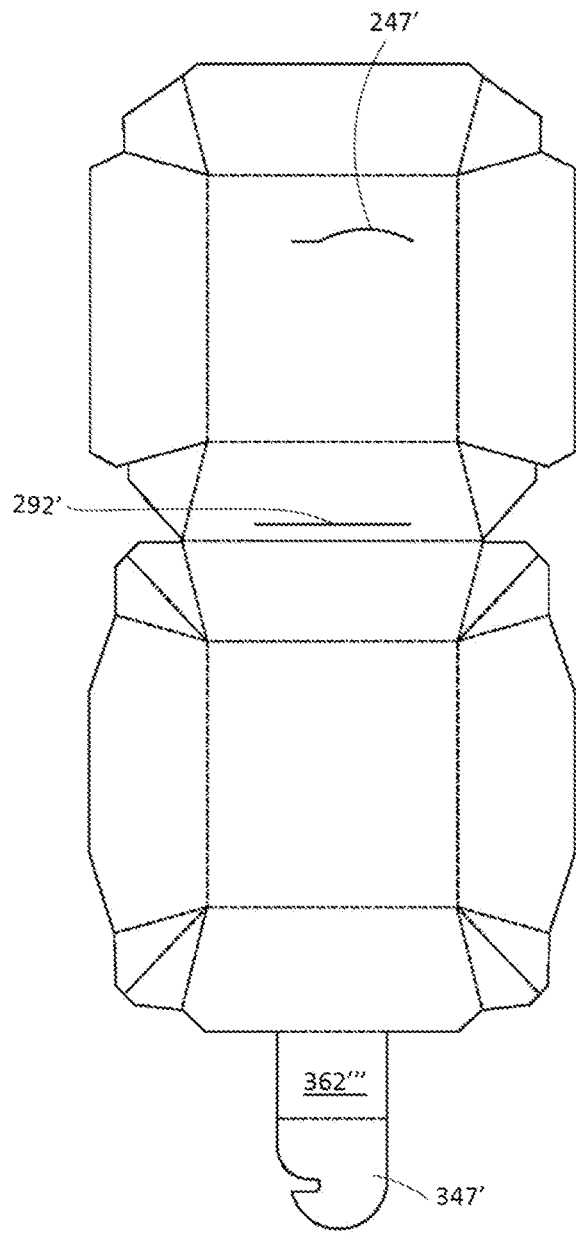
Figure 23C:
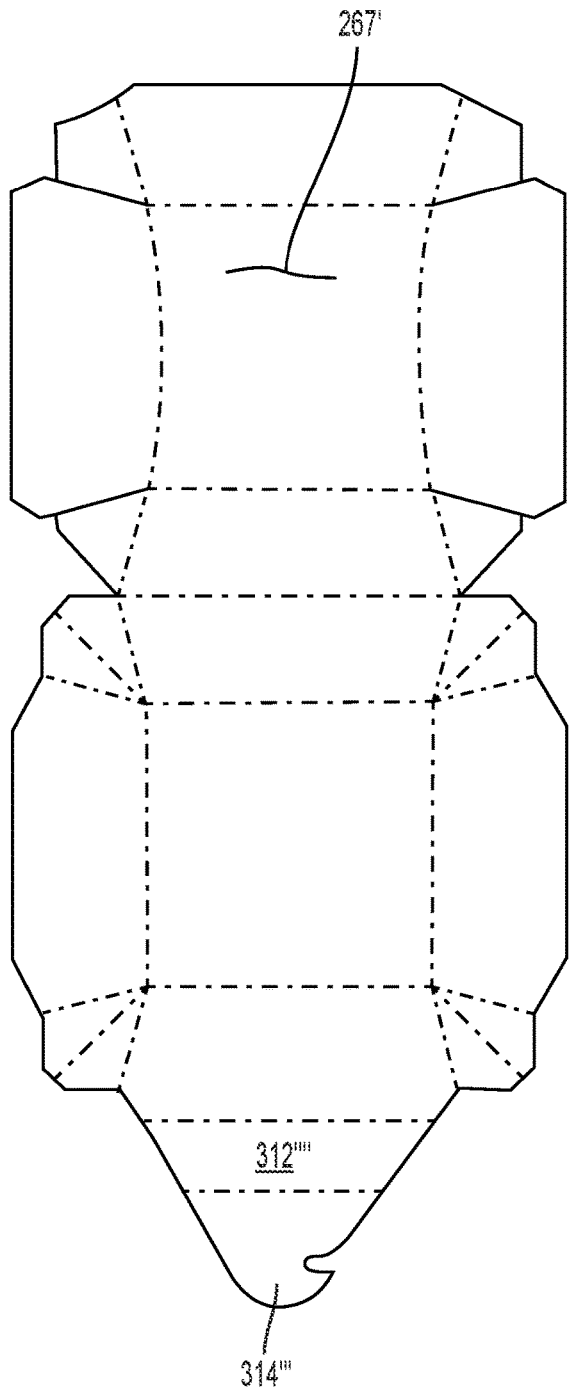
Figure 23D:
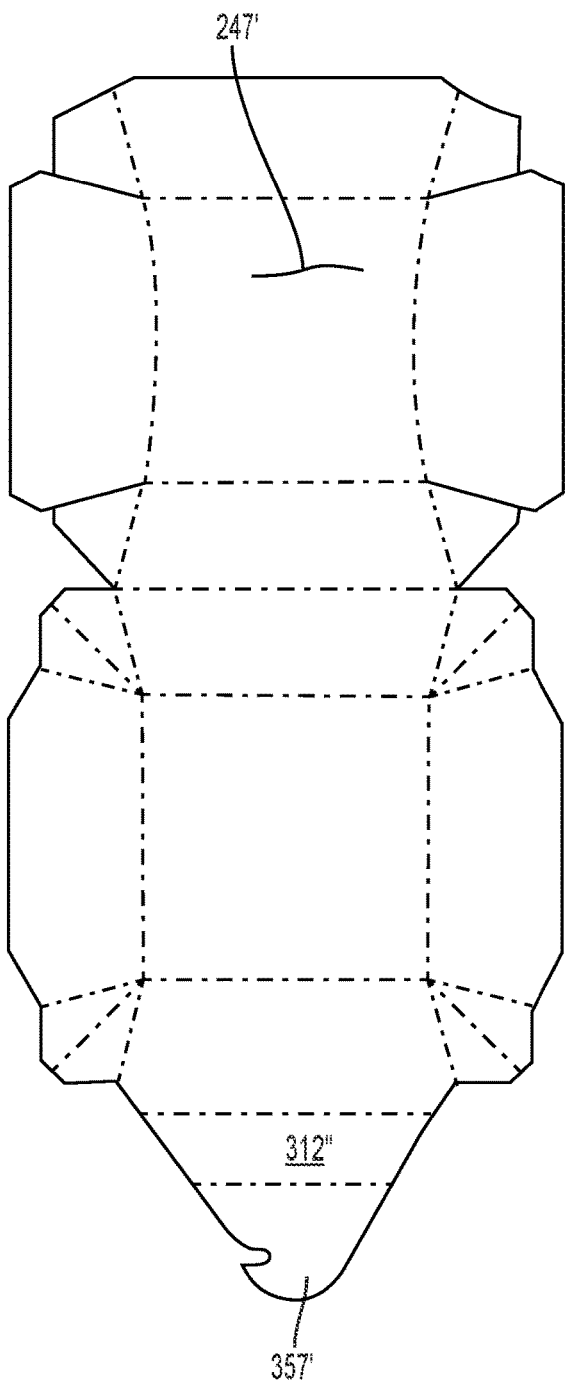
Figure 25A:
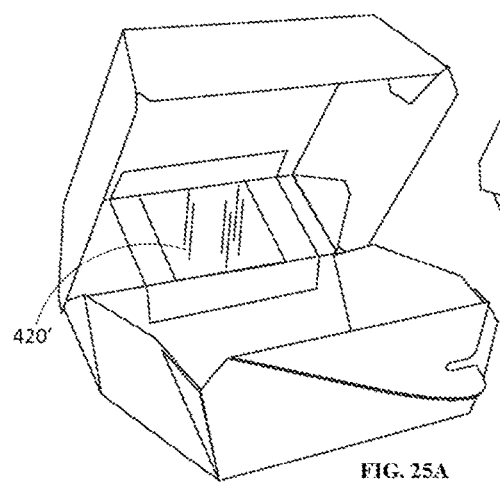
FIGS. 25A and 25B show front (FIG. 25A) and rear (FIG. 25B) views of a container with a window in the real lid panel.
Figure 25B:
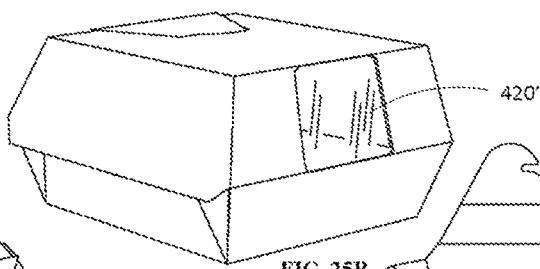

Although not illustrated in FIG. 21, the extension portion and hook, and the corresponding slit on the top lid panel may be replaced by any shape and configuration. Exemplary alternative shapes for the tab, extension portion, and slit are shown in FIGS. 9A-9F, 24A-24D, 25A-25D, and 30.

Those skilled in the art will recognize, or be able to ascertain using no more than routine experimentation, many equivalents to the specific embodiments of the invention described herein. Such equivalents are intended to be encompassed by the following claims.

We claim:

1. A clamshell container for food storage comprising,
   a tray and a lid,
   wherein the lid is hingedly attached to the tray and moveable between an open position and a closed position,
   wherein the lid comprises a top panel comprising a slit,
   wherein the-tray is liquid tight and comprises a front tray panel, with an extension portion attached thereto,
   wherein the extension portion terminates in a tab, and
   wherein the tab is configured to fit in the slit when the container is in the closed position,
   wherein the extension portion comprises a single perforated line or two perforated lines that form a front zipper, and/or wherein the lid further comprises a rear lid panel and wherein the rear lid panel comprises a single perforated line or two perforated lines that form a rear zipper.

2. The clamshell container of claim 1, wherein the lid further comprises a front lid panel, and
   wherein the extension portion lays on top of a portion of the front lid panel when the container is in a locked position.

3. The clamshell container of claim 1, wherein the tab is a right hook tab, a left hook tab, a double-sided hook tab, or a tuck tab.

4. The clamshell container of claim 1, wherein the tray comprises a bottom panel and four tray panels, wherein the four tray panels consist of the front tray panel, a rear tray panel, and two side tray panels;

wherein each of the tray panels is attached to one side of the bottom panel and protrudes upwards from the bottom panel;

wherein the lid further comprises four lid panels, consisting of a front lid panel, the rear lid panel and two side lid panels;

wherein each of the lid panels is attached to one side of the top panel and protrudes downwards from the top panel.

5. The clamshell container of claim 4, wherein each of the tray panels is attached to the adjacent tray panel via a folded gusset, wherein each gusset is secured to one of the tray panels.

6. The clamshell container of claim 4, wherein each of the lid panels is attached to the adjacent lid panel via a glue tab, wherein the glue tab is secured to one of the lid panels.

7. The clamshell container of claim 1, wherein the lid further comprises a front lid panel, and wherein the front lid panel further comprises a recessed portion.

8. The clamshell container of claim 7, wherein when the container is in the closed position, the extension portion of the tray lies on top of the recessed portion and on top of a portion of the front lid panel.

9. The clamshell container of claim 7, wherein the front lid panel further comprises two front corners, wherein each corner is one side of the recessed portion, and wherein when the container is in the closed position, the front corners lie on top of a portion of the front tray panel.

10. The clamshell container of claim 1, wherein the container further comprises one or more openings for viewing the contents in the container, and wherein the one or more openings are located in the top panel, one or more of the lid panels, or one or more of the tray panels, or in a combination thereof.

11. The clamshell container of claim 1, wherein the top panel, one or more of the lid panels, or one or more of the tray panels, or a combination thereof further comprises one or more vents for releasing heat and/or steam from the container.

12. A blank for forming the clamshell container of claim 1.

13. The blank of claim 12, comprising a tray portion and a lid portion foldably connected to each other by a first fold line, wherein the tray portion comprises
a bottom panel;
four tray panels, wherein each of the tray panels shares one side with the bottom panel and is foldably connected to the bottom panel, and wherein the tray panels consist of the front tray panel, a rear tray panel, a first side tray panel, and a second side tray panel; and
a plurality of gussets, comprising a first gusset positioned between and connecting the front tray panel to the first side tray panel, a second gusset positioned between and connecting the front tray panel to the second side tray panel, a third gusset positioned between and connecting the rear tray panel to the first side tray panel, and a fourth gusset positioned between and connecting the rear tray panel to the second side tray panel; and wherein the lid portion comprises:
the top panel comprising the slit;
four lid panels, wherein each of the lid panels shares one side with the top panel and is foldably connected to the top panel, and wherein the lid panels consist of the front lid panel, a rear lid panel, a first side lid panel, and a second side lid panel;

a plurality of glue tabs, comprising a first glue tab positioned between the front lid panel and the first side tray panel, a second glue tab positioned between the front lid panel and the second side lid panel, a third glue tab positioned between the rear lid panel and the first side lid panel, and a fourth glue tab positioned between the rear lid panel and the second side lid panel, wherein the glue tabs are configured to attach the front lid panel and the back lid panel to the first side lid panel and the second side lid panel, respectively.

14. The blank of claim 13, wherein the extension portion is attached to the front tray panel.

15. The blank of claim 13, wherein the front lid panel further comprises a recessed portion.

16. The blank of claim 12, wherein each gusset is formed from two triangular shaped gusset panels connected to each other by a second fold line therebetween.

17. A clamshell container, for food storage comprising:
a tray and a lid,
wherein the lid is hingedly attached to the tray and moveable between an open position and a closed position,
wherein the lid comprises a top panel comprising a slit,
wherein the tray is liquid tight,
wherein the tray further comprises a front tray panel and a first pair of detents protrudes from the front tray panel, and
wherein the lid further comprises a second pair of detents that are configured to contact and interlock with the first pair of detents such that the first pair of detents lies on top of the second pair of detents when the container is in the closed position.

18. The clamshell container of claim 17, wherein the lid further comprises a front lid panel, and wherein the front lid panel further comprises a recessed portion, wherein the recessed portion is defined by an upper border and two side borders,
wherein each of the side borders protrudes inwardly in the form of a tab that is configured to function as one of the detents of the second pair of detents.

19. The clamshell container of claim 17, wherein the tray comprises a bottom panel and four tray panels, wherein the four tray panels consist of the front tray panel, a rear tray panel, and two side tray panels;

wherein each of the tray panels is attached to one side of the bottom panel and protrudes upwards from the bottom panel;

wherein the lid further comprises four lid panels, consisting of a front lid panel, a rear lid panel and two side lid panels;

wherein each of the lid panels is attached to one side of the top panel and protrudes downwards from the top panel.

20. The clamshell container of claim 19, wherein each of the tray panels is attached to the adjacent tray panel via a folded gusset, wherein each gusset is secured to one of the tray panels.

21. The clamshell container of claim 19, wherein each of the lid panels is attached to the adjacent lid panel via a glue tab, wherein the glue tab is secured to one of the lid panels.

22. The clamshell container of claim 17, wherein the container further comprises one or more openings for viewing the contents in the container, and wherein the one or more openings are located in the top panel, one or more of the lid panels, or one or more of the tray panels, or in a combination thereof.

* * * * *